US008432428B2

(12) United States Patent
Moisa et al.

(10) Patent No.: US 8,432,428 B2
(45) Date of Patent: Apr. 30, 2013

(54) ROLLER ALIGNMENT

(75) Inventors: Saar Moisa, North Vancouver (CA); Greg Peregrym, New Westminster (CA); Ian Garben, Burnaby (CA)

(73) Assignee: Kodak Graphic Communications Canada Company, Burnaby (CA)

( * ) Notice: Subject to any disclaimer, the term of this patent is extended or adjusted under 35 U.S.C. 154(b) by 395 days.

(21) Appl. No.: 12/937,277

(22) PCT Filed: Apr. 14, 2008

(86) PCT No.: PCT/IB2008/000912

§ 371 (c)(1),
(2), (4) Date: Oct. 11, 2010

(87) PCT Pub. No.: WO2009/127888

PCT Pub. Date: Oct. 22, 2009

(65) Prior Publication Data

US 2011/0032322 A1 Feb. 10, 2011

(51) Int. Cl.

| | |
|---|---|
| ***B41J 2/447*** | (2006.01) |
| ***B41J 2/455*** | (2006.01) |
| ***B41J 13/02*** | (2006.01) |
| ***B65G 39/02*** | (2006.01) |

(52) U.S. Cl.
USPC .......... 347/262; 347/264

(58) Field of Classification Search .......... 347/224, 347/225, 262, 264, 101, 104, 218, 129, 139, 347/153
See application file for complete search history.

(56) References Cited

U.S. PATENT DOCUMENTS

| | | | | |
|---|---|---|---|---|
| 4,441,662 | A | 4/1984 | Seragnoli | |
| 4,650,456 | A | 3/1987 | Armington | |
| 5,164,742 | A * | 11/1992 | Baek et al. | 347/234 |
| 5,278,578 | A * | 1/1994 | Baek et al. | 347/240 |
| 5,322,231 | A | 6/1994 | Greenberg et al. | |
| 5,517,359 | A * | 5/1996 | Gelbart | 359/623 |
| 5,808,655 | A * | 9/1998 | Haas et al. | 347/234 |
| 6,957,773 | B2 * | 10/2005 | Gelbart | 235/454 |
| 7,201,524 | B2 | 4/2007 | Jones et al. | |
| 7,598,008 | B2 * | 10/2009 | Caspar et al. | 430/7 |
| 2009/0273796 | A1 * | 11/2009 | Garben et al. | 358/1.4 |

FOREIGN PATENT DOCUMENTS

| | | |
|---|---|---|
| CA | 2228623 | 12/1997 |

* cited by examiner

*Primary Examiner* — Huan Tran
(74) *Attorney, Agent, or Firm* — Nelson Adrian Blish

(57) ABSTRACT

A rotatable roller is provided which includes a first end and a second end and a surface adapted to wrap a portion of the media thereupon. A carriage conveys the roller along a path. The roller is moved by first and second drives. The first and second drives can be differentially operated to reorient the roller with respect to a direction along the path. The first drive and the second drive can be operated, differentially or non-differentially, to move the carriage along the path. The reoriented roller can be rotated about its axis while conveying the media to wrap the portion of the media onto the surface. The portion of the media can be sized to wrap over the surface of the reoriented roller without overlapping itself. The first drive and the second drive can be operated non-differentially to convey the reoriented roller along a portion of the path.

49 Claims, 16 Drawing Sheets

ROLLER ALIGNMENT

CROSS REFERENCE TO RELATED APPLICATIONS

This is a U.S. National Stage application under 35 U.S.C. 371 of International Application No. PCT/IB2008/000912, filed Apr. 14, 2008.

TECHNICAL FIELD

This invention relates to methods and apparatus for adjusting the orientation and alignment of one or more cylindrical rollers that are adapted to convey media along a conveying path. A cylindrical roller assembly in accordance with the present invention is especially useful in imaging systems, particularly when a media incorporating donor material is imaged to impart donor material onto a surface and after imaging, is removed from the surface.

BACKGROUND OF THE INVENTION

Color flat panel displays, such as liquid crystal displays and the like, typically incorporate color filters used to provide pixels with color. One technique for fabricating color filters involves a laser-induced thermal transfer process. A particular prior art thermal transfer process is illustrated schematically in FIG. 1. A substrate 10, known in the art as a receiver element, is overlaid with a donor element 12, known in the art as a donor sheet. Donor element incorporates a transferable donor material (not shown) that may comprise a colorant, a pigment, or the like used to fabricate the color filter.

Donor element 12 is image-wise exposed to cause donor material to be transferred from selected portions of donor element 12 to a surface of substrate 10. Some exposure methods employ one or more controllable lasers 14 to provide one or more corresponding laser beams 16 to induce the transfer of donor material from the imaged regions of donor element 12 to corresponding regions of substrate 10. Controllable laser(s) 14 may comprise diode laser(s) which are relatively easy to modulate, are relatively low cost, and are relatively small in size. Such laser(s) 14 are controllable to directly expose donor element 12. In some applications, masks (not shown) are used in exposing various media.

In some imaging applications, a number of different donor elements 12 are sequentially applied to substrate 10, imaged and then removed. For example, during typical fabrication of color filters, a first donor element 12 is used to apply one color, such as a red donor material to substrate 10, and the first donor element is then removed; a second donor element 12 is used to apply, for example, green donor material, and the second donor element is then removed; a third donor element 12 is used to apply, for example, blue donor material, and the third donor element is then removed.

Media loaders employing various cylindrical supports such as rollers and the like are typically employed to apply or remove flexible media such as donor element 12 to or from various surfaces. The various rollers are required to perform various operations which include but are not limited to: the transferring and loading of media into the loader, the application of media onto a surface, and the removal of media from the surface after it has undergone a processing step (e.g. imaging). Each of these operations requires roller alignments suitable for that given operation. For example, in some processes the media is stored on media rolls and a web of media is transferred from a media roll to a roller of the media loader during a loading operation. The loading operation can involve separating the media web into sheets of media. Accurate alignment between the media roll and the roller is required to ensure substantially uniform web tension to avoid the formation of wrinkles during loading. Web tension is related to the amount of force applied in the direction of travel of the web. Excessive tension can cause slippage, damage media coating(s) or even deform the web itself. Insufficient web tension can lead to wrinkles forming in the web. The difficulties associated with the loading operation can be further compounded when media is loaded from a plurality of media rolls (e.g. different colored donor elements) and each of the media rolls has a different orientation with respect to the roller sufficient to alter the web tension between the different loadings.

Imaging processes such as thermal transfer are typically sensitive to the uniformity of the interface between the applied donor element 12 and a substrate 10. Entrapped bubbles, wrinkles and the like can cause variances in the amount of donor material that is transferred to substrate 10 which can lead to various undesired image artifacts. Media that has been loaded into the media loader typically needs to be applied to substrate 10 such that a uniform interface free of wrinkles, air bubbles, etc, is created between the donor element 12 and substrate 10. Donor element 12 can be applied by a roller of the media loader (e.g. an application roller). Donor element 12 can be applied by relatively translating the media loader along an application direction while rolling donor element 12 onto substrate 10. Misalignment between the application roller and the application direction can lead to wrinkles and uneven application.

Once imaged, the spent donor element 12 is removed from substrate 10. Donor element 12 is typically removed by various rollers of the media loader (e.g. a peel roller). Donor element 12 is removed by relatively translating the media loader along a removal direction while peeling the donor element 12 away from substrate 10. Misalignment between the peel roller and the removal direction can lead to various image artifacts. For example, skew between the peel roller and the removal direction can cause shear forces that may degrade the quality of the formed image.

It now becomes apparent to those skilled in the art that various rollers within such media loaders can require different orientations for different operations thereby leading to possible conflicts. These conflicts may possibly be remedied by adopting onerous manufacturing tolerances but with an undesired increase in the cost of the device.

What is needed in the art is a media loader having one or more cylindrical rollers in which an orientation thereof can be adjusted in accordance with a specific operation required of the loader. Such operations can include loading media into the loader, applying media to a surface and removing media from a surface.

What is needed in the art is an imaging device that includes a media loader having one or more cylindrical rollers whose alignment can be adjusted in accordance with a specific function required of the media loader. The media is imaged with an imaging process that can include a thermal transfer imaging process.

SUMMARY OF THE INVENTION

The present invention relates to a method for forming an image on a media. The image can include one or more patterns of features, such as color features for a color filter or colored illumination sources as part of an organic light emitting diode display. The images can be formed by a laser-induced thermal transfer process such as a laser-induced dye-transfer process, a laser induced mass transfer process or by other means of transferring material from a donor element to a receiver element. In such processes, a donor media can be applied to and removed from a receiver.

The method can include providing a rotatable roller comprising a first end and a second end and a surface adapted to wrap a portion of media thereon. A carriage is provided to convey the roller along a path. The roller is moved by a first drive and a second drive. The first drive and second drive can be differentially operated to reorient the roller with respect to a direction along the path. The roller can be reoriented to align the roller to roll along a direction that is substantially parallel to the direction along the path. The portion of the media is conveyed while conveying the reoriented roller. The first drive and the second drive can be operated, differentially or non-differentially, to move the carriage along the path. The reoriented roller can be rotated about its axis of rotation to wrap the portion of the media onto the surface. The portion of the media can be sized to wrap over the surface of the reoriented roller without overlapping itself. The first drive and the second drive can be operated non-differentially to convey the reoriented roller along a portion of the path.

The carriage can include a first guided end and a second guided end. The first and second drives can be differentially operated to displace the second guided end relative to the first guided end along a direction that is parallel to the direction along the path. The first guided end and the relatively displaced second guided end can be moved in tandem along the path.

The first drive and the second drive can be operated differentially to align the roller to a media roll. The portion of the media can be transferred between the media roll and the aligned roller. The first drive and the second drive can be operated differentially to reduce an in-plane misalignment existing between the roller and the media roll and/or to increase uniformity of the tension created across the width of the portion of the media as the portion of the media is transferred between the media roll and the aligned roller. The axis of rotation of the aligned roller and the axis of rotation of the media roll can be intersected by a common axis. The first drive and the second drive can be operated differentially to increase the degree of perpendicularity between the common axis and each of the axis of rotation of the aligned roller and the axis of rotation of the media roll. By increasing the degree of perpendicularity it is meant that the intersecting angles are brought closer to 90 degrees.

In one embodiment, the roller is reoriented with respect to a direction along the path by differentially operating the first drive and the second drive to orient the roller with a first orientation with respect to the direction along the path at a first position along the path and differentially operating the first drive and the second drive to orient the roller with a second orientation with respect to the direction along the path at a second position along the path. The surface of the roller can be wrapped with a portion of the media when the roller is oriented with the first orientation and the wrapped portion of the media can be transferred to a substrate when the roller is oriented with the second orientation. The first and second drives can be operated non-differentially to transfer the wrapped portion of the media to the substrate. To transfer the wrapped portion of the media to the substrate, the roller can be rolled relative to the substrate when the roller is oriented with the second orientation. The media can be removed from the substrate by rolling the re-oriented roller relative to the substrate. The first drive and the second drive can be operated non-differentially to remove the portion of the media from a substrate.

In one embodiment, an apparatus for conveying media can include a rotatable roller with a first end and a second end and a surface adapted to wrap a portion of the media thereon. A carriage is moveably mounted on a support and operable for conveying the roller along a path. The roller can be an application roller, a peel roller or a take-up roller. A plurality of drives is provided for moving the roller. The plurality of drives includes a first drive and a second drive. A controller can be programmed for differentially operating the first drive and the second drive to reorient the roller with respect to a direction along the path and for operating the carriage to convey the reoriented roller while conveying the portion of the media. The controller can be programmed for operating the first drive and the second drive to move the carriage along the path. The controller can be programmed for differentially operating the first drive and the second drive while moving the carriage along a first portion of the path and non-differentially operating the first drive and the second drive while moving the carriage along a second portion of the path. The controller can be programmed for differentially operating the first drive and the second drive to displace the second end relative to the first end along a direction that is parallel to the direction along the path. The controller can be programmed for differentially operating the first drive and the second drive to move the carriage along a first portion of the path and non-differentially operating the first drive and the second drive to move the carriage along a second portion of the path. The carriage can include a first guide bearing and a second guide bearing and the controller is programmed for differentially operating the first drive and the second drive to displace the second guide bearing relative to the first guide bearing along a direction that is parallel to the direction along the path. A flexure can be provided for allowing the carriage to pivot about one of the first guide bearing and the second guide bearing.

In another embodiment, a method for imaging media includes providing a carriage operable for conveying a roller along a path. Media is mounted on the roller. The mounted media is conveyed to an imaging system positioned along the path. The roller is reoriented with respect to a direction along the path. The mounted media is transferred from the reoriented roller to a surface and the transferred media is imaged. A plurality of drives is provided for moving the roller. The drives can be operated differentially to reorient the roller with respect to the direction along the path. The drives can be operated non-differentially while transferring the mounted media from the reoriented roller to the surface. The plurality of drives can be operated to move the carriage along the path and to move the carriage while transferring the mounted media from the reoriented roller to the surface. The mounted media can be transferred from the reoriented roller to the surface by rolling the reoriented roller over the surface. In one embodiment, the roller is an application roller.

The carriage can also be operable for conveying a contact roller along the path. The orientation of the contact roller can be changed with respect to a direction along the path. The imaged media can be contacted with the reoriented contact roller and can be removed from the surface.

A plurality of drives can be operable for moving the contact roller and can be differentially operated to reorient the peel roller with respect to the direction along the path. The plurality of drives can be non-differentially operated while removing the imaged media from the surface. The plurality of drives can be operated to move the carriage while removing the imaged media from the surface. The imaged media can be removed from the surface by rolling the reoriented contact roller over the media. A take up roller can be provided for winding up the imaged media while removing the imaged media from the surface. In one embodiment, the contact roller is a peel roller.

BRIEF DESCRIPTION OF THE DRAWINGS

The present invention will now be described, by way of example, with reference to the accompanying drawings, in which.

DETAILED DESCRIPTION OF THE INVENTION

Figure 1:
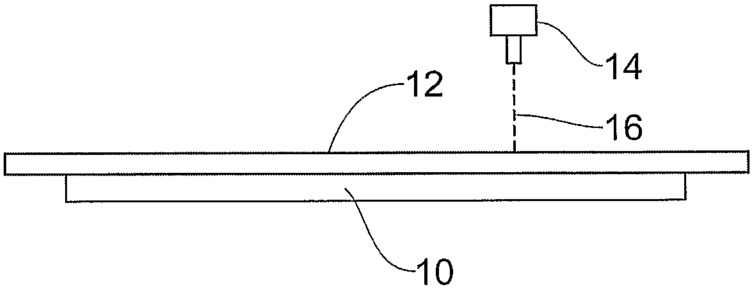
Figure 1 PRIOR ART
FIG. 1 schematically illustrates a prior art thermal transfer imaging process used to transfer donor material from a donor element to a substrate.

Throughout the following description, specific details are set forth in order to provide a more thorough understanding of the invention. However, the invention may be practiced without these particulars. In other instances, well known elements have not been shown or described in detail to avoid unnecessarily obscuring the disclosure. Accordingly, the specification and drawings are to be regarded as illustrative rather than restrictive. It is to be further noted that the drawings are not to scale.

FIGS. 2A, 2B, 2C, 2D, 2E, 2F, 2G, 2H, 2J, 2K, 2L, 2M and 2N schematically depict apparatus 102 and methods of operation thereof according to an example embodiment of the invention. In this example embodiment of the invention various donor elements 112, 114 and 116 are loaded on respective media rolls 113, 115 and 117. In this illustrated embodiment, each of the donor elements 112, 114 and 116 are media that correspond to a given color. Each of the donor elements 112, 114 and 116 undergoes a corresponding process that involves transferring a portion of the donor element to media loader 124; applying the donor element portion to a surface of substrate 110; imaging the donor element portion; and removing the spent donor element portion from the surface.

Figure 2A:
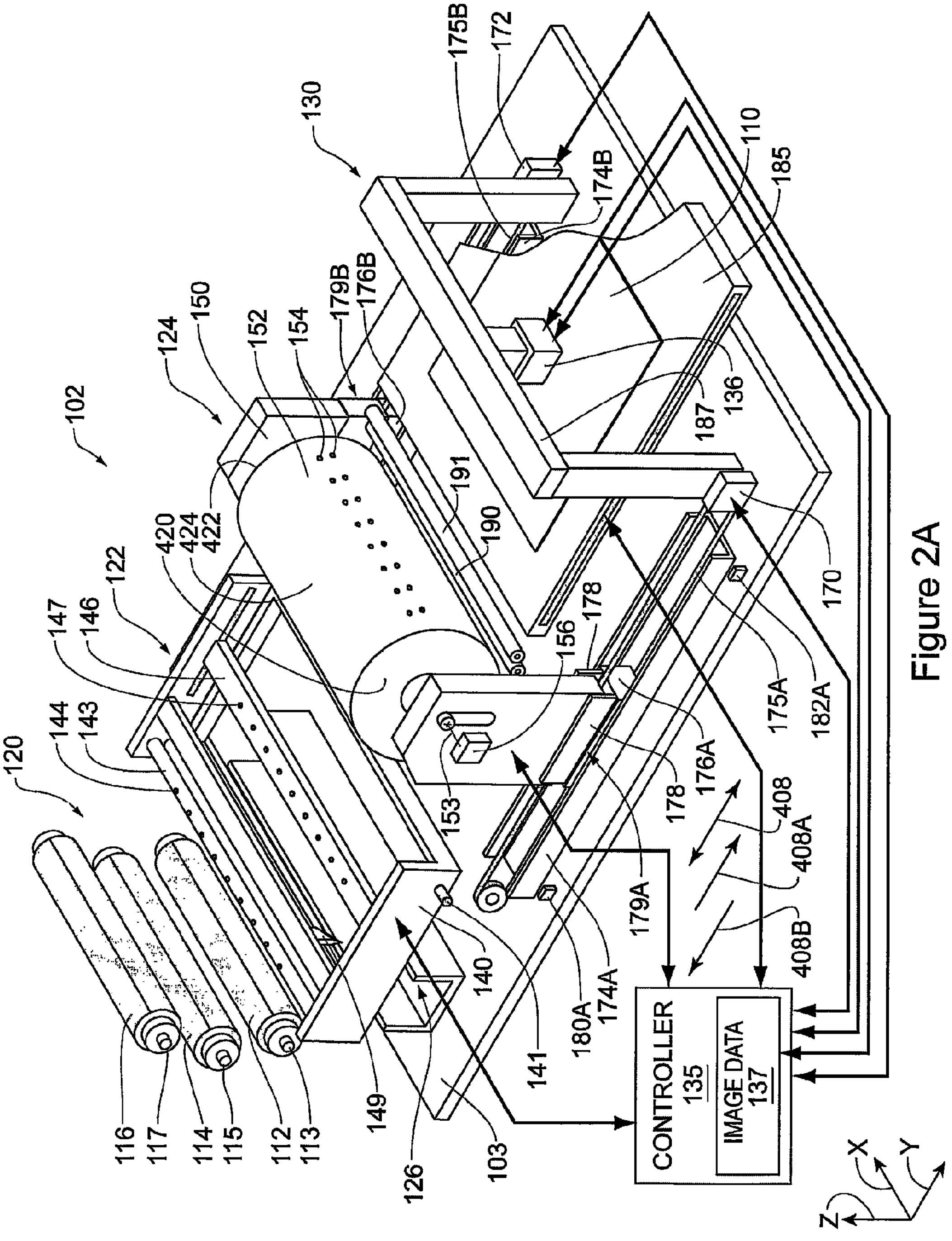
FIG. 2A schematically illustrates an apparatus as per an example embodiment of the invention.

As schematically depicted in FIG. 2A, apparatus 102 includes various sub-systems which include a media supply 120, a media feed system 122, a media apply/peel system 124 (also referred to as media loader 124), disposal system 126 and imaging system 130. These various sub-systems are positioned on support 103. Media roll system 120 stores media rolls 113, 115 and 117 and feeds selected one of the donor element to media feed system 122. The media feed system 122 secures, separates and guides portions of the selected donor element to media loader 124. Media loader 124 applies the selected donor element to substrate 110 positioned within imaging system 130. Upon completion of the imaging of the media assemblage within imaging system 130, media loader 124 removes the imaged donor element from substrate 110 and transports the donor element to disposal system 126. These various steps can be additionally performed with other donor elements selected from media rolls 113, 115 and 117. For convenience, coordinate X, Y and Z reference frame will be referred to describe apparatus 102 and various media motions.

Controller 135, which can include one or more controllers, is used to control one or more systems of apparatus 102 including, but not limited to, media supply 120 (control signal not shown), media feed system 122, media loader 124 and imaging system 130. Controller 135 can also control media handling mechanisms (not shown) that can initiate the loading and/or unloading of substrates 110 to and/or from imaging system 130. Controller 135 can also provide image data 137 to imaging head 136 and control imaging head 136 to emit radiation beams in accordance with this data. Various systems can be controlled using various control signals and/or implementing various methods. Controller 135 can be configured to execute suitable software and can include one or more data processors, together with suitable hardware, including by way of non-limiting example: accessible memory, logic circuitry, drivers, amplifiers, A/D and D/A converters, input/output ports and the like. Controller 135 can comprise, without limitation, a microprocessor, a computer-on-a-chip, the CPU of a computer or any other suitable microcontroller.

Figure 2B:
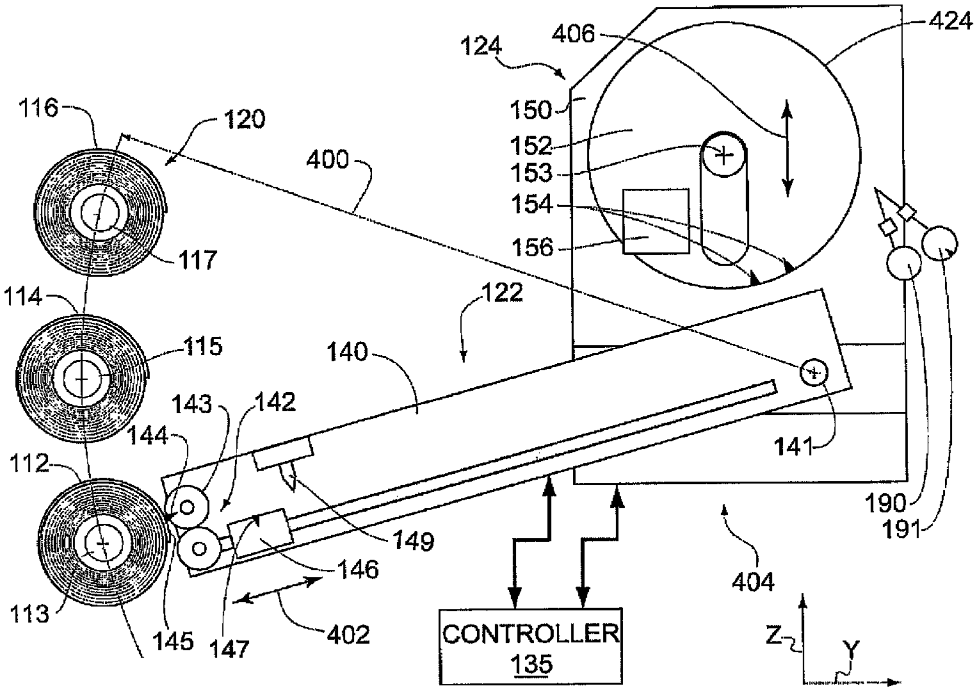
FIGS. 2B, 2C, 2D and 2E schematically show a portion of the apparatus of FIG. 2A and a method of use thereof to transfer and mount a donor element portion from a media roll onto an application roller as per an example embodiment of the invention.
Figure 2C:
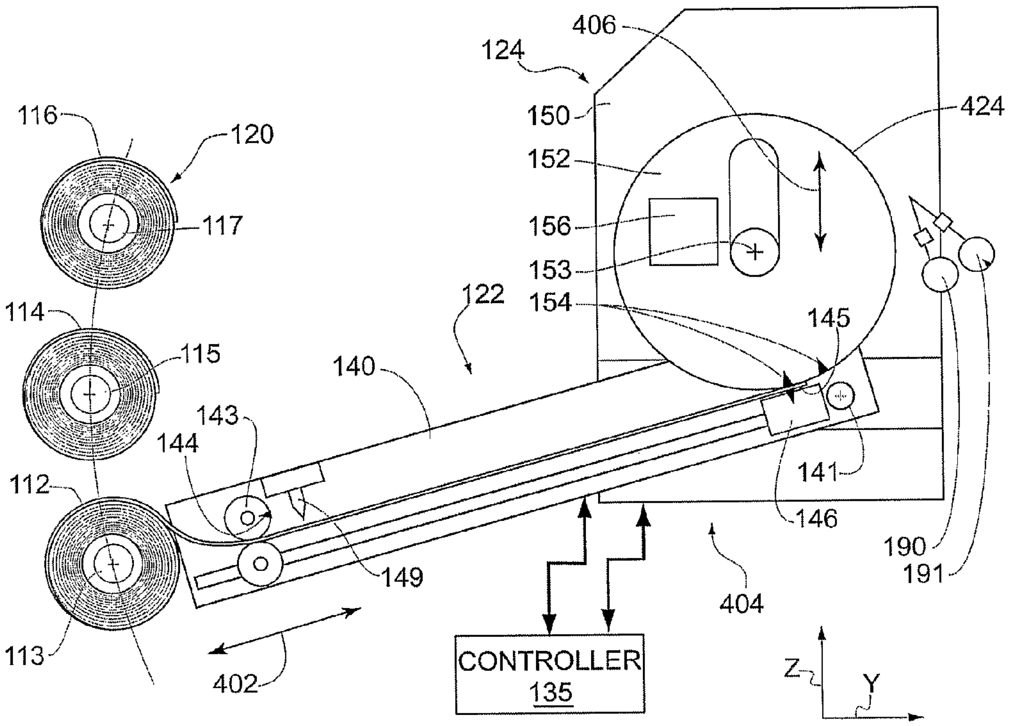
Figure 2D:
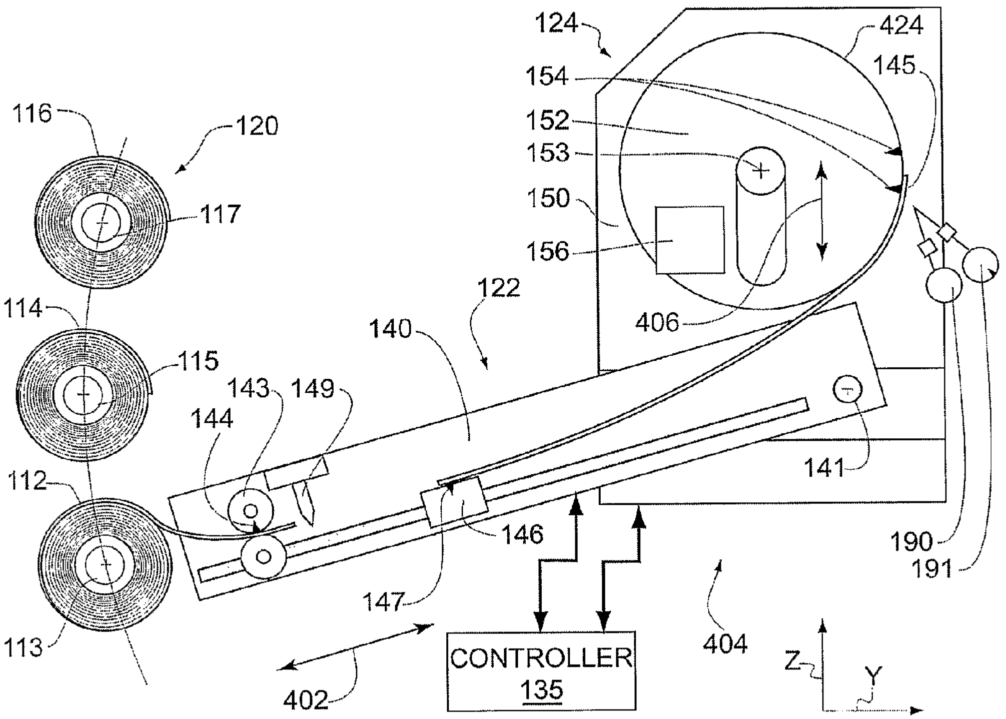
Figure 2E:
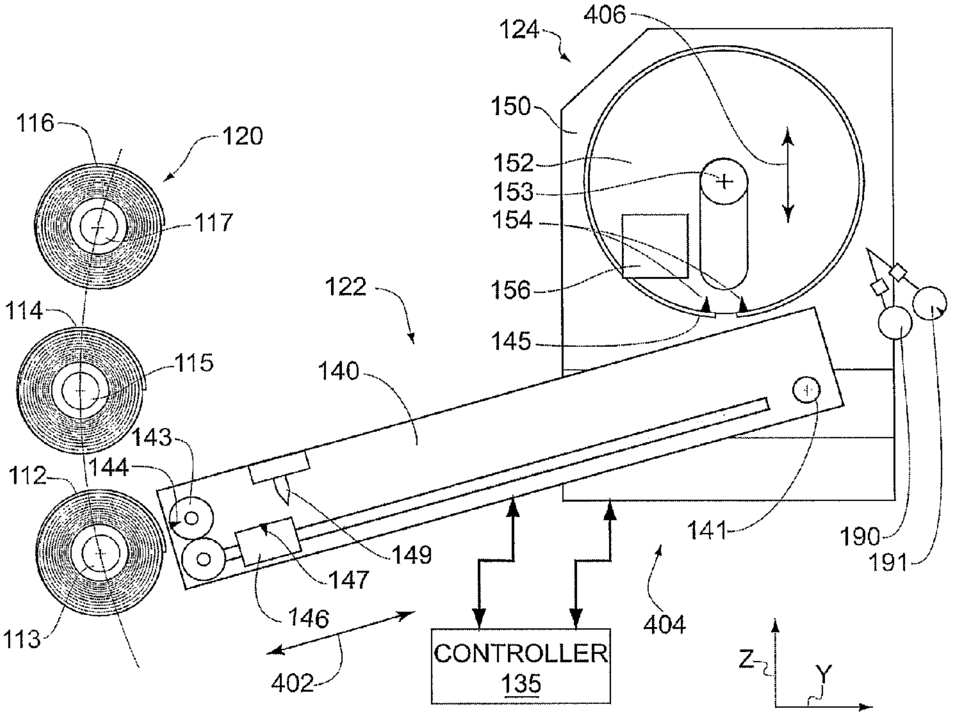
Figure 2F:
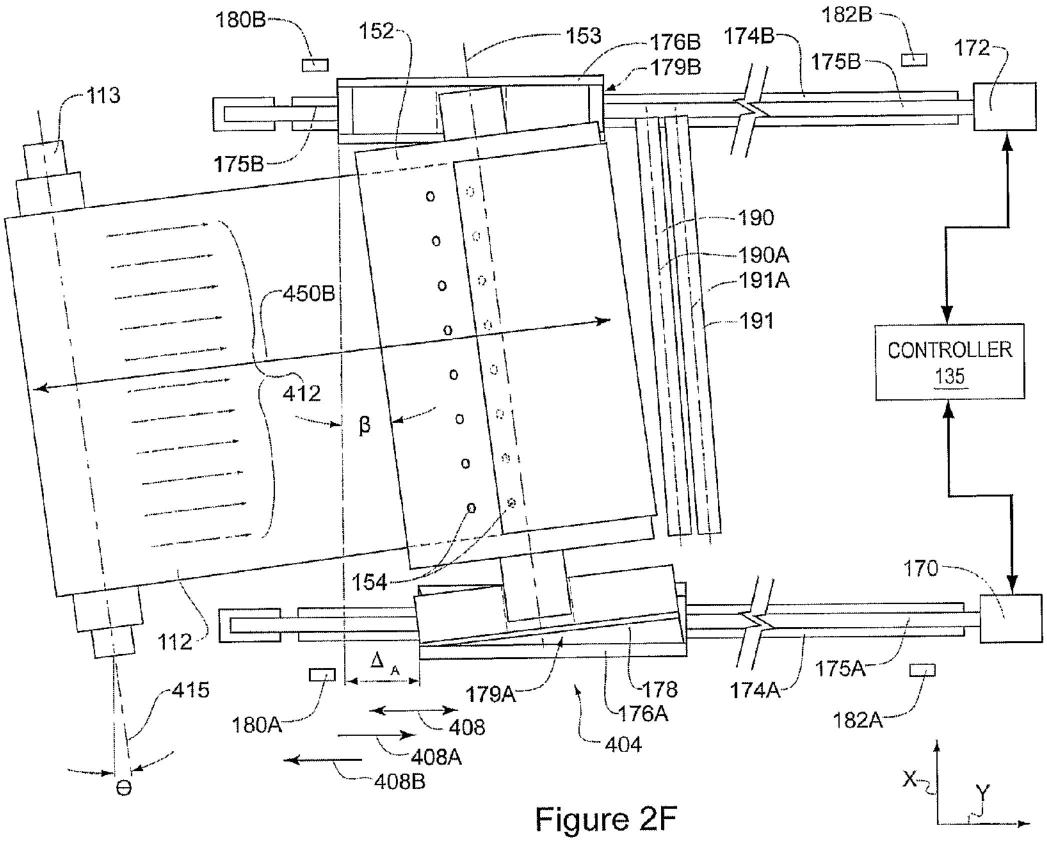
FIG. 2F schematically shows reorienting the application roller of the apparatus of FIG. 2A to substantially match the orientation of a media roll as per an example embodiment of the invention.
Figure 2G:
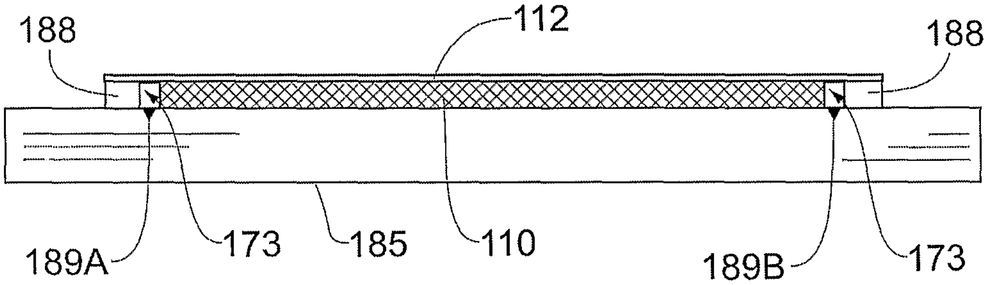
FIG. 2G schematically shows a cross-sectional view of a donor element on substrate.
Figure 2H:
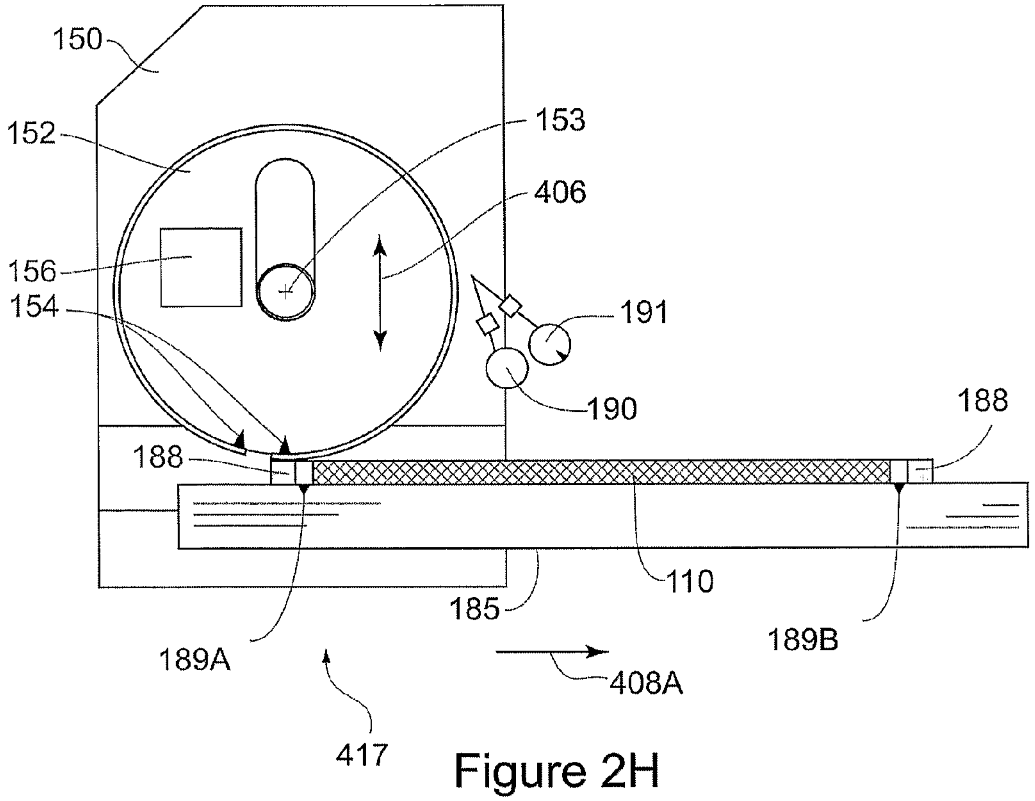
FIG. 2H schematically shows the application of a mounted donor element onto a substrate by the application roller the apparatus of FIG. 2A as per an example embodiment of the invention.
Figure 2J:
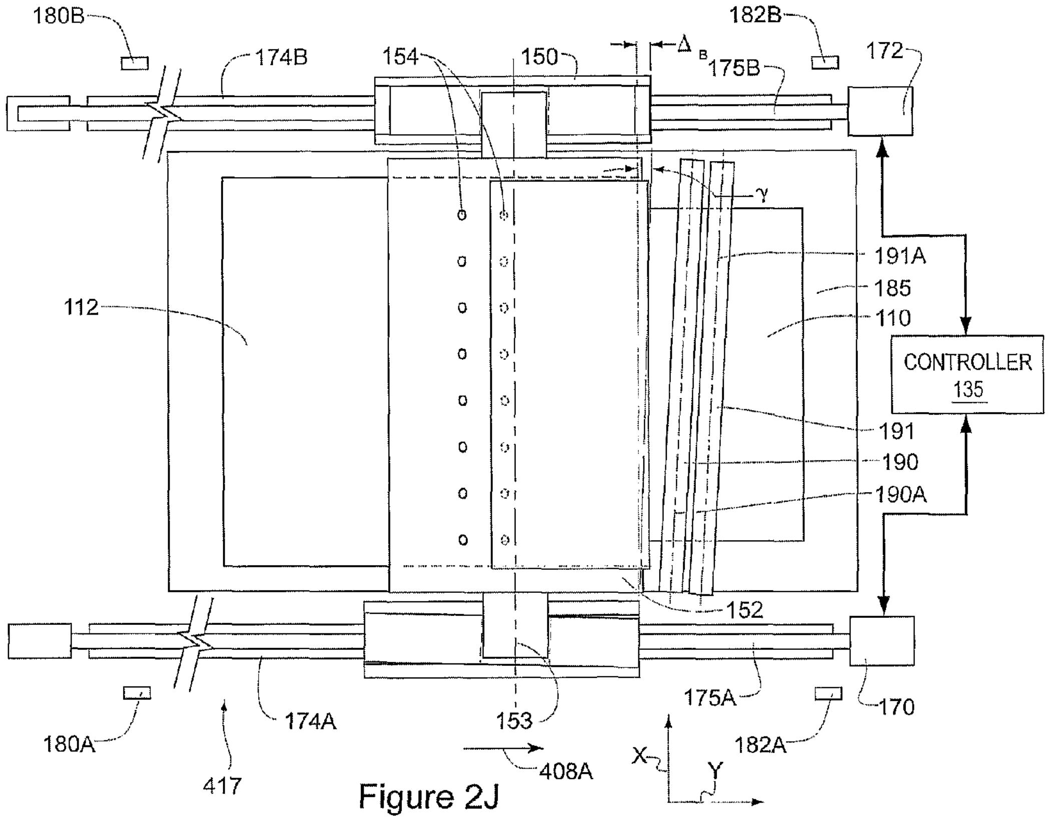
FIG. 2J schematically shows reorienting the application roller of the apparatus of FIG. 2A to roll in a direction that is substantially parallel to a desired application direction during an application of a donor element to a substrate as per an example embodiment of the invention.
Figure 2K:
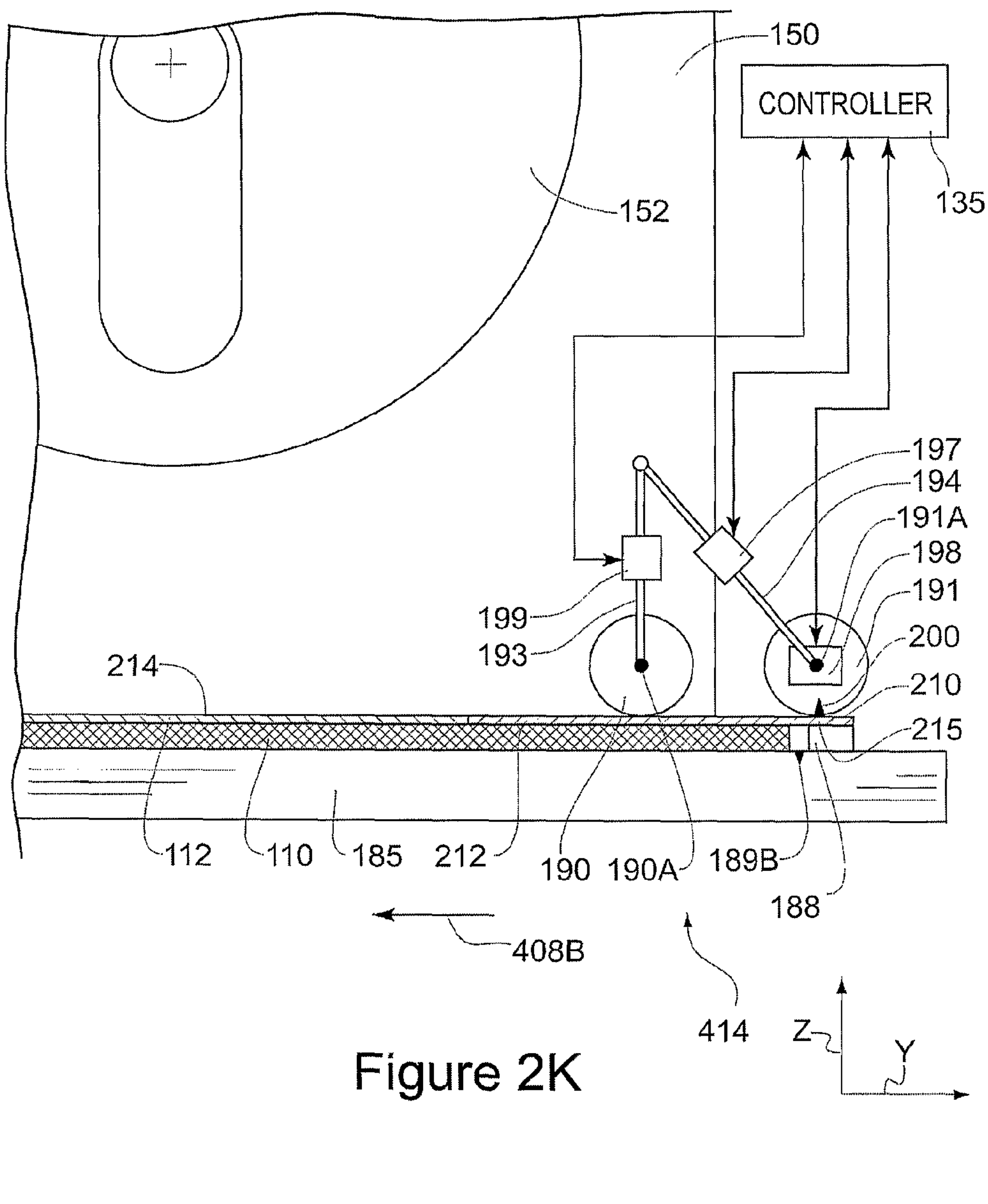
FIGS. 2K, 2L and 2M schematically show a portion of the apparatus of FIG. 2A and a method of use thereof to remove a donor element from a substrate with a peel roller and a take-up roller as per an example embodiment of the invention.
Figure 2L:
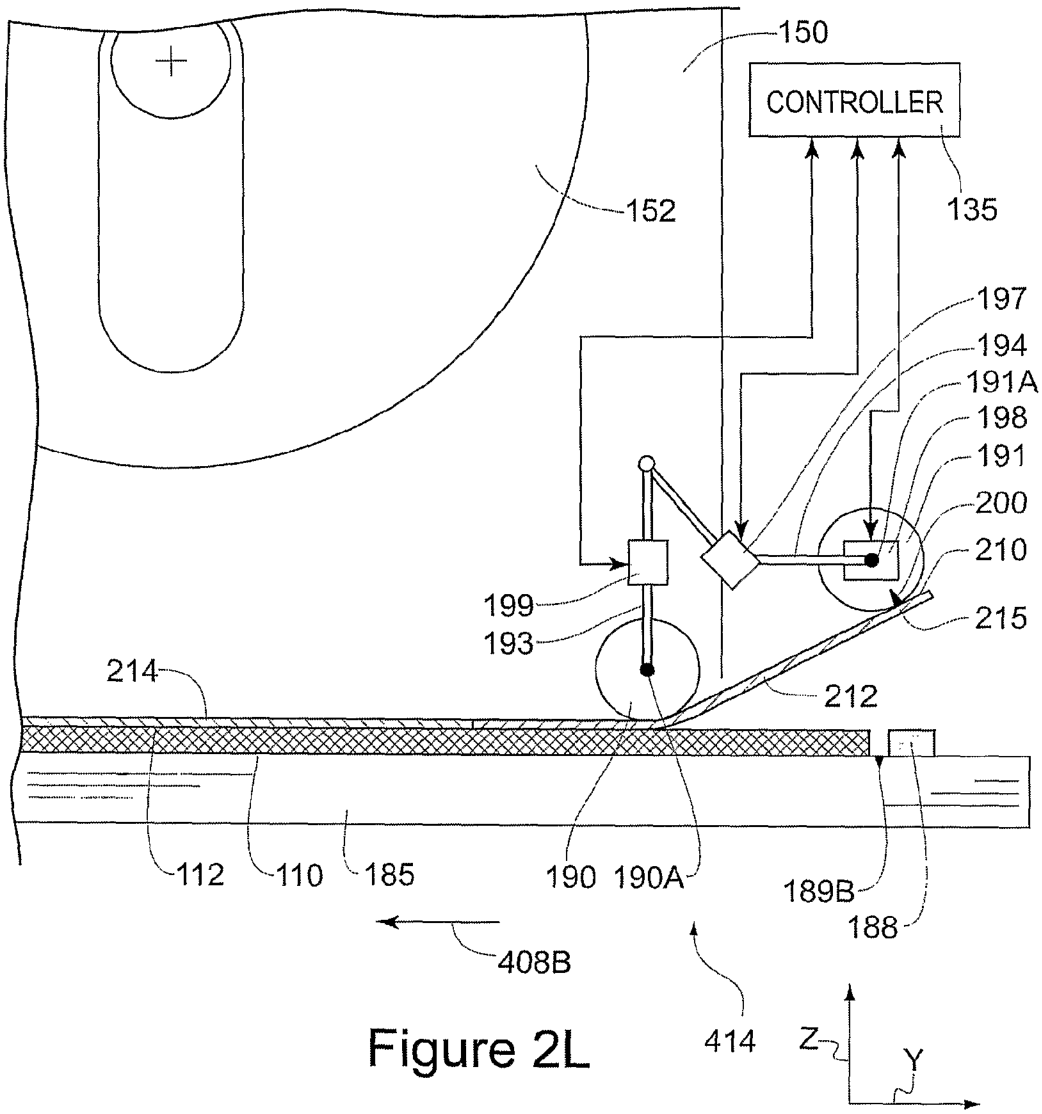
Figure 2M:
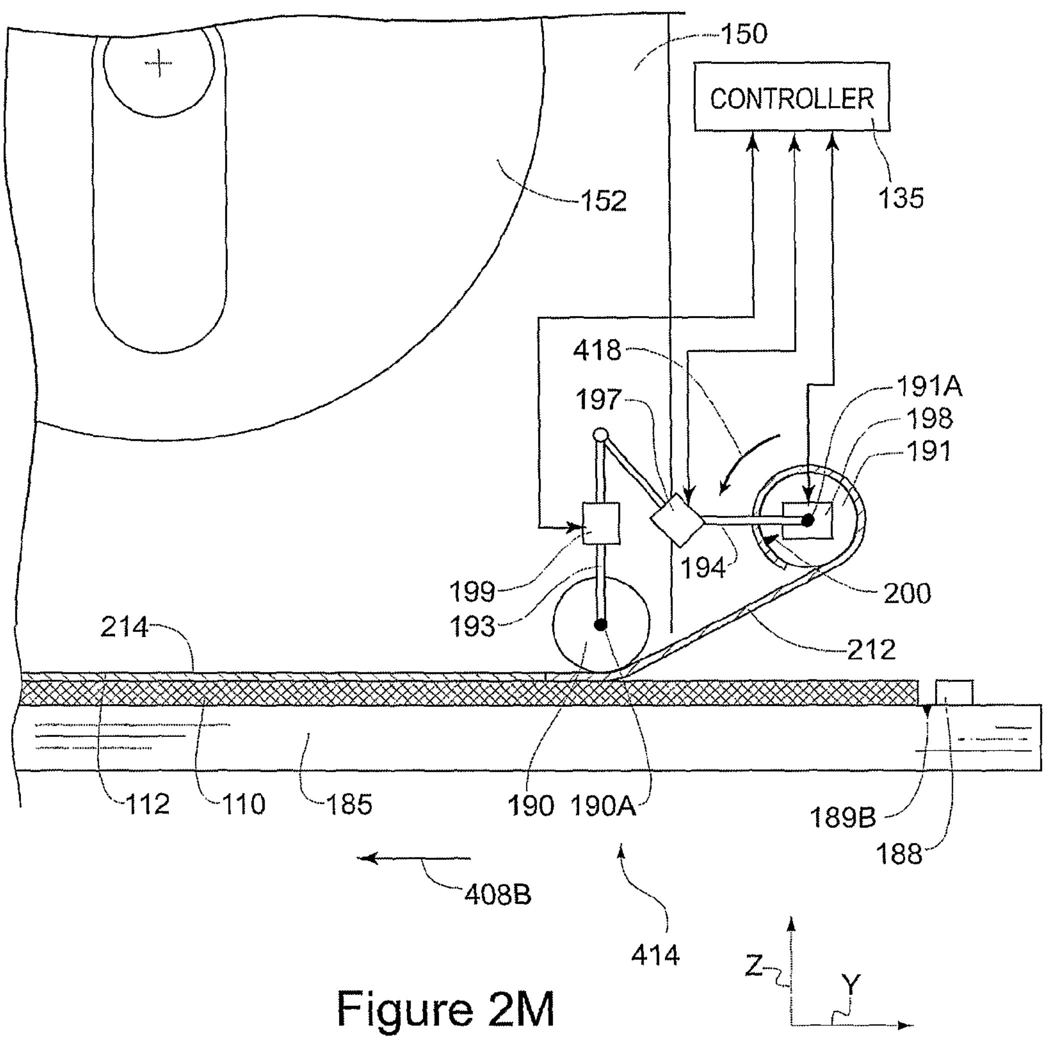
Figure 2N:
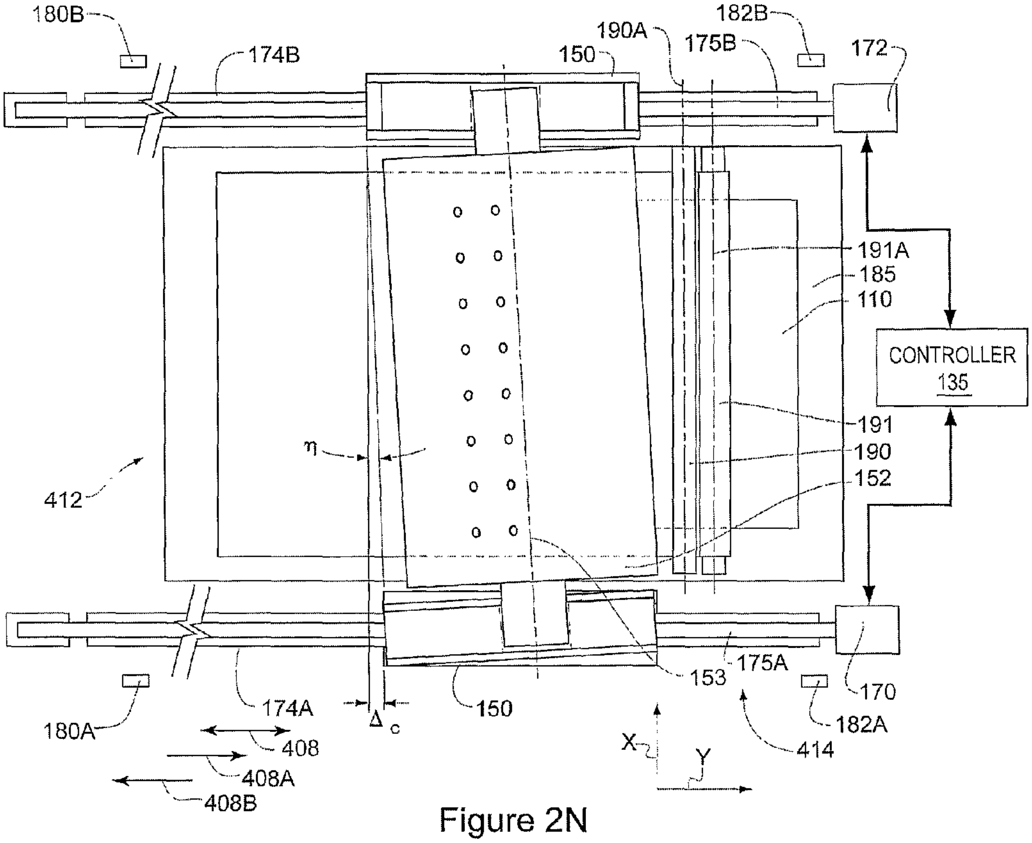
FIG. 2N schematically shows reorienting the peel roller shown in FIGS. 2K, 2L and 2M to roll in a direction that is substantially parallel to a desired removal direction during a removal of the donor element as per an example embodiment of the invention.
Figure 3:
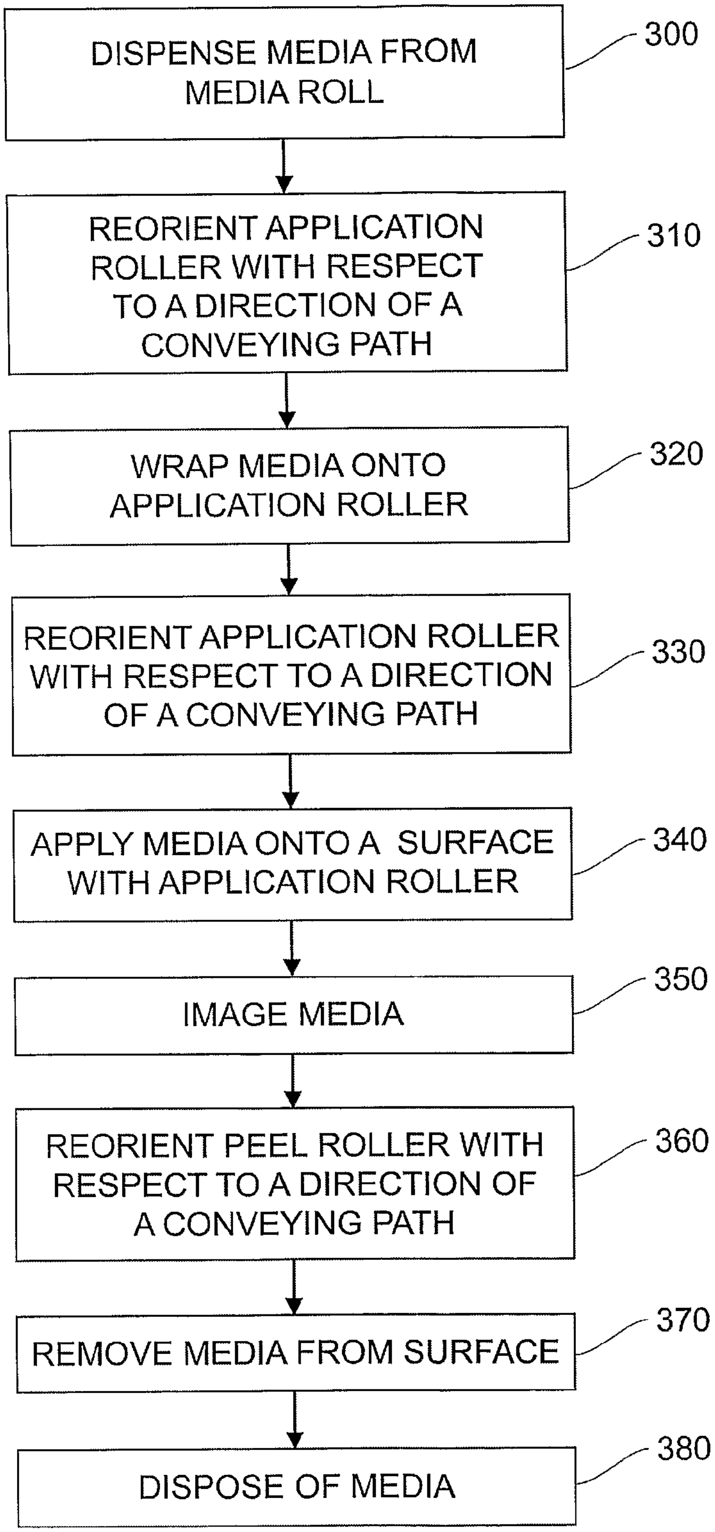
FIG. 3 shows a flow chart representing a method of use of the apparatus of FIG. 2A as per an example embodiment of the invention.

FIG. 3 shows a flow chart representative of a method for applying media in an imaging process, imaging the applied media and removing the imaged media as per an example embodiment of the invention. The various steps illustrated in FIG. 3 are described with reference to apparatus 102 shown in FIGS. 2A, 2B, 2C, 2D, 2E, 2F, 2G, 2H, 2J, 2K, 2L, 2M and 2N. This is for the purposes of illustration only and other suitable apparatus can be used in the present invention. In step 300, apparatus 102 dispenses media from media supply 120 as schematically shown in FIGS. 2B, 2C, 2D and 2E. In this example embodiment, donor element 112 is being fed from corresponding media roll 113 by media feed system 122. Various actuators (not shown) are controlled to move media feed system 122 relatively to the media rolls of media supply 120 in accordance with various signals provided by controller 135 that identify a particular donor element that is to be dispensed. In this illustrated embodiment, media feed system 122 includes a movable frame 140 that can be tilted about pivot 141 to various positions proximate to a selected media roll to secure media therefrom. In this example embodiment, each of the media rolls is positioned to be substantially on a common radius 400 originating from pivot 141. In other example embodiments, relative motion between the media feed system 122 and the media rolls can include mechanisms which can include elevator-type mechanisms, for example.

Frame 140 supports a picking mechanism 142 which includes various rolls including nip rolls and a picking roll 143. Picking roll 143 includes suction features 144 used to secure donor element 112 which has been positioned such that an edge portion 145 of this media is proximate picking roll 143. Various sensors (not shown) can be used to detect a media edge and controller 135 can position the media roller 113 to present media edge portion 145 for picking. Various actuators (not shown) move picking roll 143 relative to frame 140 along path 402 towards media roll 113 so as to position suction features 144 in the vicinity of media edge portion 145 as shown in FIG. 2B. Once media edge portion 145 is secured by suction features 144, it can be nipped and moved away from media roll 113 along path 402. Picked donor element 112 is then handed off to feed gantry 146 which is movable along frame 140. In this illustrated embodiment, feed gantry 146 includes suction features 147 which secure picked edge portion 145. Other example embodiments of the invention need not be limited to suction devices for securing media, and can use other gripping or securing devices as are well known in the art. Upon securing media edge portion 145, feed gantry 146 is moved along frame 140 to handoff the edge portion 145 to media loader 124. In this example embodiment feed gantry 146 moves along a direction aligned with path 402.

Media loader 124 is positioned at a media load position 404 to load donor element 112 thereon. As schematically shown in FIG. 2A, media loader 124 includes carriage 150 which supports various rotatable cylindrical rollers. Carriage 150 is operable for conveying the cylindrical rollers along a path. In this example embodiment of the invention, the cylindrical rollers include an application roller 152. Application roller 152 is used to apply appropriately sized media (i.e. donor elements in this example) to a surface of substrate 110 that is supported on imaging support 185 in imaging system 130. Application roller 152 is rotatable about axis 153 that intersects a first end 420 and a second end 422 of the roller. Application roller 154 has a surface 424 that is adapted to wrap donor element 112 thereon. In this example embodiment, application roller 152 includes various suction features 154 that are used to secure media such as donor element 112 as the media is wrapped onto the cylindrical surface 424 in step 320. As shown in FIGS. 2B and 2C, relative movement is provided between application roller 152 and media gantry 146 to secure edge portion 145 with various suction features 154. In this example embodiment, actuators 156 are controlled to move application roller 152 towards and away from feed gantry 146 along path 406. In this example embodiment, path 406 is aligned with the Z axis. In other example embodiments, path 406 can assume other alignments. Examples of actuators 156 which may be used to move application roller 152 include suitably coupled electric motors and/or pneumatic actuators. Once edge portion 145 has been secured by suction features 154, application roller 152 moves away from feed gantry 146 along a direction of path 406 and rotates about axis 153 to meter out a desired length of donor element 112. Donor element 112 is separated by cutter 149 once this length has been achieved as shown in FIG. 2D. In this example embodiment of the invention, cutter 149 separates donor element 112 to the desired length after feed gantry 146 has moved back and has secured donor element 112 in a region proximate cutter 149. In this example embodiment, feed gantry 146 applies controlled tension as the unwrapped remainder of separated donor element 112 is applied to application roller 152.

In this example embodiment, application roller 152 is sized such that the separated donor element substantially covers the entirety of the perimeter of the application roller 152 without overlapping itself as shown in FIG. 2E. Donor element 112 has a non-negligible thickness, and the end of donor element 112 creates a step at the edge, which could cause a discontinuity or the like to form if the donor element 112 overlapped itself when applied to application roller 152. Such a discontinuity can affect the uniformity of the donor material of donor element 112 as it is subsequently applied to substrate 110 by application roller 152 and can lead to visual artifacts.

Figure 4:
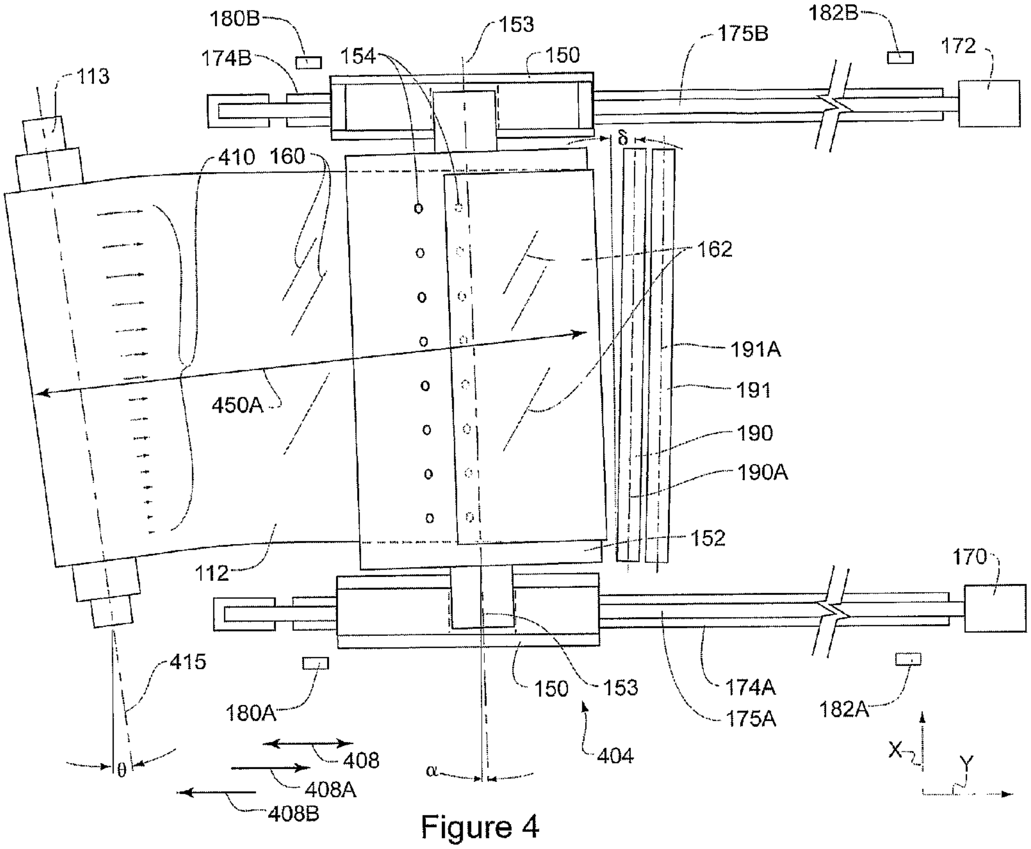
FIG. 4 schematically shows a typical misalignment that can exist between an application roller and a media roll during a mounting of a donor element to the application roller.

FIG. 4, shows a schematic plan view of a typical misalignment that can exist between application roller 152 and a media roll 113 during the mounting of donor element 112 to application roller 152. In this case "in-plane" misalignment occurs between application roller 152 and media roll 113. The term "in-plane" refers to misalignment in the plane of the media web if it were to extend substantially "un-twisted" between media roll 113 and application roller 152. FIG. 4, shows that if the axis of rotation 153 of application roller 152 and the axis of rotation 415 of media roll 113 were both intersected by a common axis 450A, the misalignment would prevent common axis 450A from being perpendicular to both the axis of rotation 153 and the axis of rotation 415. In this case media roll 113 is skewed with respect to the orientation of application roller 152. The skew of media roll 113 can be expressed in the X-Y coordinate frame by an angle $\theta$ referenced from the X axis. Application roller 152 is also shown skewed with respect to the X-Y coordinate frame by angle $\alpha$. In this case $\alpha$ is smaller than angle $\theta$ and also represents a misalignment of application roller 152 with respect to the opposing guided ends of carriage 150. As illustrated herein, orientations of various roller and media rolls are referenced with respect to the X axis. This is done for convenience, and it is to be understood that these orientations can be referenced with respect to other directions. For example, the orientation of the various rollers and media rolls can be referenced with respect to a direction of a path that the rollers are conveyed along. In this illustrated embodiment, various rollers are conveyed along a path aligned with the Y axis. Angles $\theta$ and $\alpha$ have been exaggerated for clarity and it is to be noted that even small angles can cause the problems described herein. For example, the inventors have noted that in some applications, misalignments on the order of a few milli-radians can lead to undesired wrinkling with media webs comprising widths on the order of approximately two (2) meters and calipers of approximately 0.05 mm. In other applications, misalignments of greater than 1 or 2 two milli-radians are not acceptable and cause undesirable wrinkling. In still other applications, even misalignments of greater than 0.1 milli-radians are not acceptable. Although narrower web widths can be used in attempt to mitigate wrinkling, this approach is unsatisfactory when larger web widths are required (e.g. when large format color filters such as large screen television color filters are required). Alternatively, the use of longer web lengths between the media rolls and application roller 152 can be used in attempt to help mitigate wrinkling, but this approach is also unsatisfactory as it can require an undesirable increase in the overall size of apparatus 102.

Misalignments of the media rolls can occur for various reasons. For example, manufacturing and positional tolerances associated with the support structures and mechanisms used to support the various media rolls can contribute to these misalignments. Misalignment can lead to increased stress variations in the media web. Additionally, the media assembled on the media rolls may assume a tapered form rather than a cylindrical form. Tapered media rolls can arise from variances in the web manufacturing process that create a media roll that varies in diameter from end-to-end. This tapered form may vary from media roll to media roll and can also lead to increased stress variations in the media web. If the web stress is not uniform across the web, the high tension area can damage various coatings (e.g. donor material of a donor element) or in the extreme, stretch or break the media substrate itself. Low tensioned areas can in turn cause a loss of web tension control. Misalignments can additionally wrinkle media especially when it has a light caliper. FIG. 4 schematically shows a resulting non-uniform stress distribution 410 created by the misalignment. FIG. 4 shows wrinkles 160 formed in the unsupported web as well as entrapped wrinkles 162 formed on the portion of donor element 112 that has been wrapped around application roller 152. Suction applied by suction features 154 may sometimes "smooth-out" very small wrinkles formed by very minor misalignments but this same suction can also trap larger wrinkles as donor element 112 is secured to application roller 152. In this example embodiment, application roller 152 is used to subsequently lay donor element 112 onto a surface for additional processing (i.e. imaging in this case). The visual quality of imaging processes such as laser-induced thermal transfer are typically sensitive to variances in the spacing between the donor element and a substrate onto which it is applied. The inventors have noted that trapped wrinkles such as wrinkles 162 can be transferred when donor element 112 is applied to substrate and this can detrimentally impact the visual quality of the images that are subsequently formed. This problem is further compounded when multiple media rolls, each potentially having different degrees (i.e. different orientations) of misalignment, are processed as would be the case in a typical color filter fabrication process. It is to be noted that the aforementioned wrinkling problems are primarily associated with in-plane misalignment. The inventors have found that minor amounts of "out-of-plane twisting" of the media web between media roll 113 and application roller 152 typically do not cause unduly large stress risers in the web or significantly act as the cause of wrinkles. Out-of-plane twisting can occur as web twists as it is transferred between rolls or between a roll and a roller.

Misalignment between application roller 152 and media roll 113 is corrected in step 310 which reorients application roller 152 with respect to a direction of the path along which the application roller 152 is conveyed. With reference to FIG. 2F, a plurality of drives which in this example embodiment include a first drive 170 and a second drive 172 are used to position application roller 152 in an orientation in which undesired loading problems are avoided. In some example embodiments, drives 170 and 172 are used to reorient application roller 152 to substantially match an orientation of media roll 113. In some example embodiments of the invention, drives 170 and 172 are used to create a substantially uniform tension across the width of web of the donor element 112 (e.g. represented by a substantially uniform stress distribution 412 in FIG. 2F). In some example embodiments of the invention, drives 170 and 172 are used to reorient application roller 152 to reduce the formation of entrapped wrinkles as donor element 112 is wrapped around application roller 152. In this illustrated embodiment, the axis of rotation 153 of application roller 152 and the axis of rotation 415 of media roll 113 are both intersected by a common axis 450B and drives 170 and 172 are oriented to increase the degree of perpendicularity between common axis 450B and each of axis of rotation 153 and axis of rotation 415. By degree of perpendicularity, it is meant that the angles between the common axis 450B and each axis of rotation 153 and 415 are brought closer to 90 degrees. In some example embodiments, donor element 112 can twist slightly about common axis 450B as it extends from media roll 113 to reoriented application roller 152.

In this illustrated embodiment, first drive 170 and second drive 172 are each independently controllable to position corresponding ends of application roller 152 to reorient roller 152 to substantially match an alignment of media roll 113. Each of first drive 170 and second drive 172 include motive elements that convert energy into mechanical motion. Each of the first drive 170 and the second drive 172 can include various motors including servo motors and stepper motors. Each of the first drive 170 and the second drive 172 can include transmission members that can include suitable belts, screws, rack and pinions, and the like.

In this example embodiment of the invention, first drive 170 and second drive 172 are controlled to move carriage 150 along first guide 174A and second guide 174B (collectively referred to as guides 174). Carriage 150 is movable along guides 174 to various positions required by the various functions of media loader 124. In this example embodiment of the invention, carriage 150 is movable along a path 408 substantially aligned with the Y axis. Carriage 150 is movable along various directions along the path. In this example embodiment, carriage 150 is moveable along away direction 408A and along home direction 408B. In this example embodiment of the invention, first drive 170 and second drive 172 are controlled to reorient carriage 150 at various positions to assume a skewed orientation with respect to a direction of path 408. These skewed orientations are controlled to cause the various cylindrical rollers of media loader 124 to assume a desired orientation at each of these positions. For example, in the illustrated example embodiment of the invention, each of first drive 170 and second drive 172 includes a motor (not shown) coupled to respective timing belts 175A and 175B. Opposing ends of carriage 150 are attached to the guide bearings 176A and 176B which are respectively guided by guides 174A and 174B. In this example embodiment, one guided end of carriage 150 is coupled with guide coupling 179A to the guide bearing 176A while an opposing guided end of carriage 150 is coupled with guide coupling 179B to the guide bearing 174B. Guide coupling 179A has a lower stiffness than guide coupling 179B. This low stiffness coupling can be created by various compliant members which in this example embodiment include flexures 178. In this example embodiment, guide coupling 179A allows for some degree of movement along the X axis and some degree of rotation about the Z axis, which can help to prevent binding of carriage 150 as it moves along guides 174. In this example embodiment of the invention, this compliance is used to facilitate a desired orientation of various cylindrical rollers of carriage 150. In some example embodiments of the invention, limit switches (not shown) can be used to minimize or prevent skewed carriage conditions that could cause damage to various mechanisms.

Home sensor 180A and away sensor 182A are provided for first drive 170 whereas home sensor 180B and away sensor 182B are provided for second drive 172. Home sensors 180A and 180B and away sensors 182A and 182B are used to detect end-of-travel conditions. In this example embodiment, first drive 170 and second drive 172 each include gear-head servo-motors, servo-motor drivers and encoders (all not shown). Both drives 170 and 172 are controlled by controller 135 which controls the motor torque, receives motion feedback from the encoders and monitors home sensors 180A and 180B and away sensors 182A and 182B. For clarity, communication signals between controller 135 and home sensors 180A and 180B and away sensors 182A and 182B are not shown. Upon initialization, both drives 170 and 172 are driven to move carriage 150 towards home sensors 180A and 180B at a relatively slow speed. Each of the drives 170 and 172 will independently stop when their respective home sensor is triggered. At this point, controller 135 has “coarse” position knowledge of each drive’s absolute position. Each of drives 170 and 172 then moves away from their corresponding home sensors until each has received an index signal from their respective encoder thereby providing controller 135 with “fine” position knowledge for each of the drives. At this point, controller 135 has sufficient information to set the alignment of carriage 150 for various operations.

In this example embodiment of the invention, first drive 170 and second drive 172 are driven differentially by controller 135 to cause carriage 150 to assume an orientation at the media load position 404 in which application roller 152 is aligned with media roll 113. Appropriate alignment between application roller 152 and media roll 113 can include an application roller orientation that reduces media wrinkles to acceptable levels. In the illustrated embodiment shown in FIG. 2F, application roller 152 is aligned to substantially match the orientation of media roll 113 in a plane defined by the X and Y axis. Once oriented, application roller 152 rotates about its axis 153 to wrap donor element 112 onto it. FIG. 2F schematically shows a reduction of entrapped wrinkles associated with this orientation.

In this example embodiment, application roller 152 was reoriented with respect to direction of travel of carriage 150 along path 408. In this example, the direction of travel was along away direction 408A. First drive 170 and second drive 172 were differentially controlled to move corresponding opposing guided ends of carriage 150 so as to displace the ends by different amounts during a motion of carriage 150 along guides 174. Flexures 178 allow for relative displacement between the guided ends of carriage 150. As shown in FIG. 2F, each of carriage 150 and application roller 152 have assumed skewed orientations at load position 404. Opposing guided ends of carriage 150 have been displaced with respect to one another along a direction of travel by displacement $\Delta_A$ so as to skew carriage 150 by angle β (as referenced with axis X in the X-Y plane). Depending on the initial alignment of application roller 152 with respect to carriage 150 (i.e. angular misalignment α in this case as shown in FIG. 4), the amount of skew between application roller 152 and axis X may or may not be different than the amount of skew created between carriage 150 and axis X.

Drives 170 and 172 can be driven differentially to produce a desired orientation in application roller 152 as roller 152 is conveyed along a path by carriage 150. In some example embodiments, drives 170 and 172 are driven non-differentially during a portion of the path such that the corresponding ends of carriage 150 are moved substantially evenly, and are driven differentially during an additional portion of the path. In some example embodiments, the opposing guided ends of carriage 150 can be moved in tandem during a portion of the traveled path and then moved differentially during another portion of the path or at a particular position. Drives 170 and 172 can be driven to cause the opposing guided ends of carriage 150 to be driven with different speeds or by different amounts of travel. Controller 135 can alter the driving of at least one first drive 170 and second drive 172 in accordance with various additional factors (e.g. backlash in the drive systems). With reference to a previously cited example, a two (2) meter wide media requiring an angular correction of a mere one (1) milli-radian in the orientation of application roller 152 would require that drives 170 and 172 be driven differentially to produce approximately a two (2) millimeter displacement between the opposing guided ends of carriage 150 (i.e. assuming guides 174A and 174B are spaced approximately two (2) meters apart from one another). It becomes apparent that even minor angular corrections can require comparatively large displacements which can be advantageously achieved by the differential control of first drive 170 and second drive 172.

Misalignment between application roller 152 and media roll 113 can also be corrected by variations of the illustrated embodiment of the invention. For example, application roller 152 can be conveyed to media load position 404 to assume a particular orientation with media roll 113. In some example embodiments, first drive 170 and second drive 172 are driven non-differentially to convey application roller 152 to media load position 404. In some cases, the orientation of application roller 152 at media load position 404 may or may not be substantially parallel to the orientation of media roll 113. Feed gantry 146 transfers media edge portion 145 of donor element 112 to application roller 152 which secures it with suction features 154 at media load position 404. However, prior to completely wrapping the desired portion of donor element 112 about cylindrical surface 424 as previously described in step 320, first drive 170 and second drive 172 are driven differentially to adjust the orientation of application roller 152 to create a substantially uniform tension across the media web. The desired media tension can be achieved by operating first drive 170 to maintain its corresponding end of carriage 150 at the media load position 404 while operating second drive 172 to adjust its corresponding end of carriage 150 away from media load position 404. In some example embodiments of the invention, the readjustment of second drive 172 can be accomplished by operating it in a constant torque mode, which causes its corresponding carriage end to reposition by an amount determined by the resulting tension in the media web (i.e. a counter force being applied by the media roll 113 itself, various nip rollers, feed gantry 146 or other suitable mechanisms). In other example embodiments of the invention, both first drive 170 and second drive 172 are non-differentially driven to apply a substantially equal drive forces to their corresponding ends of carriage 150 to adjust the carriage end positions with respect to media load position 404 to achieve a substantially uniform tension across the width of the web. In various example embodiments of the invention, application roller 152 is rotated to wrap a portion of donor element 112 onto cylindrical surface 424 as either one or both of first drive 170 and second drive 712 are readjusted at media load position 404.

In the illustrated embodiment, the servo-motors of the first drive 170 and second drive 172 are driven differentially using positional information provided by their respective encoders. Closed loop positional control techniques as known in the art of servo-motor control can be practiced to increase the positional accuracy of the guided carriage ends. Other example embodiments of the invention can incorporate other forms of drives 170 and 172. For example, stepper motors can be controlled differentially by varying the number of control pulses provided to the motors.

Various processes such as the fabrication of color filters can require that additional media (e.g. donor elements 114 and 116) from different media rolls (e.g. media rolls 115 and 117) are mounted onto application roller 152 in a similar fashion to previously described application of donor element 112. In some cases, the additional media is mounted onto application roller 152 after previously mounted media is removed from application roller 152. The previously loaded media can be removed from application roller 152 for additional processing. It is to be noted that these additional media rolls can comprise orientations that differ from the previously processed roll (i.e. media roll 113 in the illustrated embodiment). In some example embodiments, controller 135 differentially controls first drive 170 and second drive 172 with different control parameters selected to reorient application roller 152 with an orientation that best suits a given media roll's orientation. Advantageously, theses embodiments allow application roller 152 to be properly oriented while preserving the ability to process different media.

After donor element 112 has been mounted onto the reoriented application roller 152, application roller 152 is conveyed to imaging system 130. In step 340, mounted donor element 112 is applied by application roller 152 onto a surface of substrate 110 which is in turn supported by imaging support 185. Imaging system 130 includes at least one imaging head 136 which can move relatively with respect to imaging support 185. In this example embodiment of the invention, imaging head 136 is movably supported on bridge support 187 which spans over imaging support 185. Imaging head 136 is controlled by controller 135 to move relatively to bridge support 187. Various motion systems (not shown) are used to provide relative motion between imaging head 136 and imaging support 185. These motion systems can include any suitable drives, transmission members, and/or guide members needed for the required motion. In this example embodiment of the invention, the motion systems are controlled by controller 135 to move imaging support 185 along a path aligned with the Y axis while moving imaging head 136 along a path aligned with the X axis. Those skilled in the art will realize that other forms of motion are also possible. For example, imaging head 136 can be stationary while imaging support 185 is moved. In other example embodiments, imaging support 185 is stationary and imaging head 136 is moved. One or both of imaging head 136 and imaging support 185 can reciprocate along corresponding paths. Separate motion systems can also be used to operate different systems within imaging system 130.

Imaging head 136 can include a radiation source (not shown), such as a laser. Imaging head 136 can be controlled to direct one or more radiation beams (not shown) capable of forming image on media. The imaging beams generated by imaging head 136 are scanned over the media while being image-wise modulated according to image data 137 specifying the image to be written. One or more imaging channels (not shown) are driven appropriately to produce radiation beams with active intensity levels wherever it is desired to form an image portion. Imaging channels not corresponding to the image portions are driven so as not to image corresponding areas. Imaging head 136 can include a plurality of channels that can be arranged in an array. An array of imaging channels can include a one dimensional or a two dimensional array. A radiation beam can undergo a direct path from a radiation source to the media or can be deflected by one or more optical elements towards the media.

Images can be formed on media by different methods. For example, the media can include an image modifiable surface, wherein a property or characteristic of the modifiable surface is changed when irradiated by a radiation beam to form an image. A radiation beam can be used to ablate a surface of the media to form an image. In this illustrated embodiment of the invention, a thermal transfer imaging process is employed.

FIG. 2G schematically depicts a cross-sectional view of donor element 112 on substrate 110. In FIG. 2G substrate 110 is secured to imaging support 185. As is known in the art, there are a variety of techniques for securing substrate 110 to support 185. In this illustrated embodiment, donor element 112 is applied atop substrate 110. To preserve image quality, it is desirable that donor element 112 be prevented from moving with respect to substrate 110 during imaging. In the illustrated embodiment, imaging support comprises stands 188 which are transversely spaced apart from the edges of substrate 110 and which have heights that are substantially similar to the thickness of substrate 110. Imaging support 185 also comprises one or more suction features 189A and 189B which apply suction in spaces 173 between stands 188 and substrate 110. This suction secures donor element 112 to substrate 110. It will be appreciated by those skilled in the art that there are other additional and/or alternative techniques for securing donor element 112 to substrate 110 and the invention should be understood to accommodate such additional and/or alternative donor element securing techniques.

The transfer of donor material (not shown) from donor element 112 to substrate 110 may be implemented using a variety of laser-induced thermal transfer techniques, for example. Examples of laser-induced thermal transfer processes in conjunction with which the invention may be used include: laser-induced "dye transfer" processes, laser-induced "melt transfer" processes, laser-induced "ablation transfer" processes, and laser-induced "mass transfer" processes.

In general, the make-up of substrate 110, donor element 112, and the donor material depend on the particular imaging application. In particular embodiments, imaging system 130 is used to fabricate color filters for displays on substrate 110. In such embodiments, substrate 110 is typically made of a transparent material (e.g. glass), donor element 112 is typically made of plastic and the donor material typically comprises one or more colorants. Such colorants may include suitable dye-based or pigment-based compositions, for example. The donor material may also comprise one or more suitable binder materials.

The visual quality of the images is typically dependant on the uniformity with which the media is laid down. Surface irregularities can lead to various image artifacts. For example, in laser-induced thermal transfer imaging processes, variances in the transfer of donor material can arise as a consequence of irregularities in the interface between the donor element and the substrate. A non-uniform interface between the donor element and the substrate can cause variances in the amount of donor material that is transferred, or adversely impact the ability of donor material to separate from the donor element or adhere to the substrate. Accordingly, laying media such as donor element 112 with minimal surface irregularities (e.g. wrinkles) is desired.

FIG. 2H schematically shows the application of mounted donor element 112 onto substrate 110 by application roller 152 as per an example embodiment of the invention. Carriage 150 is moved along a direction of the conveying path (i.e. away direction 408A in this case) into proximity of substrate 110 at media application position 417. Application roller 152 is positioned such that an edge portion of donor element 112 is in proximity to suction features 189A in imaging support 185. In this example embodiment, actuators 156 are controlled to move application roller 152 towards imaging support 150 along a direction of path 406. Various suction features 154 in application roller 152 are disabled while suction features 189A are enabled during the application of the edge portion of donor element 112 to substrate 110. Remaining portions of donor element 112 are applied to substrate 110 by moving carriage 150 along an application direction (i.e. along guides 174) while rotating application roller 152 to roll these portions onto substrate 110. In this example embodiment, carriage 150 is moved along away direction 408A during the rolling.

Uniform application of donor element 112 to substrate 110 can require that the rotational axis 153 of application roller 152 to be appropriately aligned with the application direction of carriage 150. A skewed orientation between the rotational axis 153 of application roller 152 and the application direction can lead to lateral forces and even slippage in the extreme which can cause a non-uniform application of donor element 112 to substrate 110. The undesirable lateral forces can result in stretching or wrinkling of the donor element 12. The lateral forces can also result in movement of the application roller along the axis 153 or vibration when the application roller is lifted from the substrate 110. This can result in a degradation of the quality of the image.

In step 330, first drive 170 and second drive 172 are controlled to reorient application roller 152 with respect to a path of travel to apply donor element 112 to substrate 110 as per an example embodiment of the invention. In this illustrated embodiment, drives 170 and 172 are driven differentially at various points along a path of travel of carriage 150 to produce the desired orientation in application roller 152 with respect to a direction along the path. In this illustrated embodiment, the path of travel extends from the media load position 404 to the media application position 417. In this illustrated embodiment, the path of travel extends along away direction 408A to media application position 417. In this illustrated embodiment, drives 170 and 172 are differentially driven to cause application roller 152 to be reoriented to roll in a direction that is substantially parallel to the application direction of carriage 150 during the subsequent application of donor element 112 to substrate 110 (i.e. as shown in FIG. 2J). In this example embodiment, the application direction is aligned with away direction 408A. As shown in FIG. 2J, drives 170 and 172 were differentially driven to move corresponding opposing ends of carriage 150 so as to displace the ends by different amounts during a motion of carriage 150 along guides 174. As shown in FIG. 2J, carriage 150 has assumed a skewed orientation with respect to the application direction of travel while application roller 152 is shown in an orientation that is substantially perpendicular to a direction of travel required by the application of donor element 112 to substrate 110. Opposing ends of carriage 150 have been displaced with respect to one another along a direction of travel to media application position 417 by displacement $\Delta_B$ so as to skew carriage 150 by angle $\gamma$ (as referenced with axis X in the X-Y plane). In this example embodiment, angle $\gamma$ is different than angle $\beta$ and is selected to apply donor element 112 onto substrate 110 rather than angle $\beta$ which was selected to wrap donor element 112 onto the application roller 152. Accordingly, the opposing ends of carriage 150 have been displaced from their media loading positions as shown in FIG. 2F to their new positions as shown in FIG. 2J. In this example embodiment of the invention, angle $\gamma$ adjusts for the initial misalignment (i.e. represented by angle $\alpha$ as shown in FIG. 4) of application roller 152. After application roller 152 is correctly reoriented, first drive 170 and second drive 172 are controlled to move carriage 150 along a desired application direction to apply donor element 112 to substrate 110 as shown in FIG. 2J. In some example embodiments, drives 170 and 172 are driven non-differentially during the application of donor element 112 to substrate 110.

Once donor element 112 has been applied to substrate 110, the media is imaged by imaging head 182 in step 350. In this example embodiment, imaging beams emitted by imaging head 136 are scanned across the media to cause donor material to be transferred from donor element 112 to substrate 110 in a laser-induced thermal transfer imaging process.

Once imaged, donor element 112 is spent and is removed from a surface of substrate 110 in step 370. Removal of donor element 112 can be required for various reasons including, but not limited to, the preparation of substrate 110 for the application and imaging of other media (e.g. donor elements 114 and 116). Spent donor element 112 can be removed from substrate 110 by various techniques. Some of these removal techniques can include peeling donor element 112 from substrate 110.

FIGS. 2K, 2L, 2M and 2N schematically show the removal of spent donor element 112 from substrate 110 as per an example embodiment of the invention. FIG. 2K is a schematic partial side view depicting one end of imaging support 185, substrate 110 and donor element 112 and carriage 150. Carriage 150 includes various cylindrical rollers which in this illustrated embodiment of the invention, includes a peel roller 190 and a take-up roller 191. Each of peel roller 190 and take-up roller 191 includes first and second ends that are intersected by a corresponding axis of rotation and each roller further includes a surface adapted to wrap media over a portion thereof. Peel roller 190 and a take-up roller 191 are respectively mechanically coupled to carriage 150 by a corresponding pair of roller couplings (peel roller coupling 193 and take-up roller coupling 194). Peel roller coupling 193 and take-up roller coupling 194 permit their respective rollers 190, 191 to rotate about their corresponding rotation axes 190A, 191A. As illustrated, take-up roller coupling 194 comprises an actuator 197 which effects movement of the axis 191A of take-up roller 191 with respect to carriage 150. Actuator 197 is referred to herein as the "take-up roller axis-position actuator 197". Peel roller coupling 193 comprises an actuator 199 which effects movement of the axis 190A of peel roller 190 with respect to carriage 150. Actuator 199 is referred to herein as the "peel roller axis-position actuator 199". Peel roller axis-position actuator 199 and take-up roller axis-position actuator 197 may be controlled by controller 165 using various signals and can each include any suitably coupled actuator(s). Examples of actuators which may be used to provide take-up roller axis-position actuator 197 and peel roller axis-position actuator 199 include suitably coupled electric motors and/or pneumatic actuators.

As illustrated, take-up roller coupling 194 also comprises a take-up roller rotational actuator 198 which causes rotation of take-up roller 191 about its axis 191A. Take-up roller rotational actuator 198 may be controlled by controller 135 using various signals. Preferably, take-up roller rotational actuator 198 comprises a suitably coupled motor, but take-up roller rotational actuator 198 may generally comprise any suitably configured actuator. Suction features 200 are provided to assist in the removal of the donor element 112. In the illustrated embodiment, peel roller 190 is a non-driven "idler" roller. In alternative embodiments, peel roller 190 may be rotationally driven.

When it is desired to remove donor element 112 from substrate 110, controller 135 controls first drive 170 and second drive 172 to create relative movement between carriage 150 and imaging support 185, such that carriage 150 is positioned at a media removal position 414 in the vicinity of one edge portion 210 of donor element 112. FIG. 2K shows that peel roller axis-position actuators 199 were controlled to move peel roller 190 along a direction that has at least a component parallel to the Z axis. Peel roller 190 moves toward donor element 112 until it makes contact with donor element 112. Preferably, peel roller 190 contacts donor element 112 in a non-imaged region 212 (i.e. outside of an imaged region 214). This positioning of the contact between peel roller 190 and donor sheet 112 avoids an impact of peel roller 190 in imaged region 214 and prevents any corresponding degradation of the image in imaged region 214.

As shown in FIG. 2K, controller 135 also uses various signals to cause take-up roller axis-position actuator 197 to move take-up roller 191 into the vicinity of donor element 112. Preferably, take-up roller 191 moves into the vicinity of non-imaged region 212 of donor element 112 at a location that is further from imaged region 214 than the location of peel roller 190. In some embodiments, as shown in FIG. 2K, take-up roller 191 moves into the vicinity of portion 215 of non-imaged region 212. In some embodiments, take-up roller 191 moves into the vicinity of portion 215 at a location which at least partially overlies stand 188. In some embodiments, take-up roller 191 moves into the vicinity of non-imaged region 212 at a location that is spaced further from the edge of substrate 110 than the suction features which secure donor sheet 112 to substrate 110 (i.e. suction features 189B in this example). Take-up roller 191 makes contact with donor element 112 and causes a portion of non-imaged region 212 (including portion 215) to adhere to take-up roller 191.

FIG. 2L shows that once portion 215 of donor element 112 is secured to the cylindrical surface of take-up roller 191, controller 135 causes take-up roller axis-position actuator 197 to move take-up roller 191 away from substrate 110 (i.e. in a direction that has at least a component in parallel to the Z axis). As can be seen by comparing FIGS. 2K and 2L, take-up roller axis-position actuator 197 causes movement of take-up roller 191 with respect to carriage 150 and with respect to peel roller 190 while carriage 150 and peel roller 190 remain in the same positions. Portion 215 of donor element 112 and possibly other portions of donor element 112 move away from imaging support 185 when take-up roller 191 moves in this manner.

As shown in FIG. 2L, peel roller 190 preferably remains in contact with, and may exert force against, donor element 112. Consequently, a portion of donor element 112 on one side of peel roller 190 remains in contact with substrate 110 while another portion of donor element 112 peels away from substrate 110 and partially wraps around the circumferential surface of peel roller 190.

As carriage 150 is translated along home direction 408B and as take-up roller 191 rotates in the direction of arrow 418, donor element 112 is "taken up" by (i.e. winds around the cylindrical surface of) take-up roller 191 as shown in FIG. 2M. Peel roller 190 remains in contact with the portion of donor element 112 which is still on substrate 110 and may apply a force against donor element 112.

The simultaneous rotation and translation of both peel roller 190 and take-up roller 191 during the sheet peeling process also prevents a "print-through" effect. Print-through effects can arise when a media is wrapped around a roller as the roller is translated to peel the media. Since the media edge can have a non-negligible thickness, the edge of the media that is initially secured to the roller can cause a portion of the unpeeled media to exhibit a discontinuity when the secured edge is rolled over it. In this illustrated embodiment, since take-up roller 191 is spaced-apart from substrate 110, the imaged region 214 is unaffected since edge portion 210 is wrapped around take-up roller 191 and does not directly roll over imaged portion 214. The change in thickness caused by the edge of edge portion 210 of donor element 112 therefore does not impact the image imparted onto substrate 110. In some example embodiments of the invention, artifacts such as print-through artifacts are not prevalent and additional rollers such as take-up roller 191 are not employed. In some example embodiments, media is removed by continuously wrapping itself around a roller that is rolled across the media during the removal process.

Other artifacts can occur when media is removed from a surface. For example, in thermal transfer processes where a donor element is peeled from a substrate by rolling a contact roller across the media, various artifacts can occur when there is misalignment between the contact roller and the removal direction. Peel roller 190 is one example of a contact roller. During the previously described donor element removal operation, carriage 150 is constrained to move along direction 408B by guides 174. If peel roller 190 is skewed with respect to this direction, shear forces can arise at the peeling interface between donor element 112 and substrate 110 which may disrupt the formed images. FIG. 4 shows an example in which peel roller 190 is skewed with respect to the X-Y coordinate frame by angle δ. In this case angle δ also represents a misalignment of peel roller 190 with respect to the opposing guided ends of carriage 150.

In step 360, first drive 170 and second drive 172 are controlled to align peel roller 190 to remove donor element 112 from substrate 110 as per an example embodiment of the invention. In this illustrated embodiment, drives 170 and 172 were driven differentially at various points along a path of travel of carriage 150 to produce the desired orientation in peel roller 190. In this illustrated embodiment, the path of travel was towards media removal position 414. In this illustrated embodiment, drives 170 and 172 were differentially driven to cause peel roller 190 to be aligned to roll in a direction that is substantially parallel to a conveyance direction of carriage 150 during the removal of donor element 112 from substrate 110. The drives 170 and 172 were differentially driven to move corresponding opposing ends of carriage 150 so to displace the opposing guided ends by different amounts during a motion of carriage 150 along guides 174. As shown in FIG. 2N, carriage 150 was presented to media removal position 414 such that the rotation axis 190A of peel roller 190 was oriented substantially perpendicular to a direction of travel required by the subsequent removal of donor element 112 from substrate 110. Opposing ends of carriage 150 were displaced with respect to one another by displacement $\Delta_C$ so as to skew carriage 150 by angle η (as referenced with axis X in the X-Y plane). In this example embodiment, angle η is different than angle γ shown in FIG. 2J and is selected to remove donor element 112 from substrate 110 rather than applying donor element 112 to the substrate 110. Accordingly, the opposing ends of carriage 150 have been displaced from their media loading positions as shown in FIG. 2J to their new positions as shown in FIG. 2N. In this example embodiment of the invention, angle η also adjusts for the initial misalignment (i.e. represented by angle δ) of peel roller 190 with respect to carriage 150 as shown in FIG. 4. Once peel roller 190 was correctly oriented, first drive 170 and second drive 172 are controlled to move carriage 150 to remove donor element 112 from substrate 110. In some example embodiments, drives 170 and 172 are driven non-differentially during the removal of donor element 112 from substrate 110 as shown in FIG. 2N. In this example embodiment of the invention, angle η was selected to reduce the presence of sheer forces at a peeling interface created by peel roller 190 during the removal of donor element 112 from substrate 110.

Once spent donor element 112 has been peeled from substrate 110 and has been spooled onto take-up roller 191, carriage 150 is moved towards disposal unit 126 to dispose donor element 112 in step 380. In this example embodiment, take-up roller rotational actuator 198 is controlled to unwind donor element 112 from take-up roller 191 to dispose of spent donor element 112 into disposal unit 126.

Advantageously, first drive 170 and second drive 172 can be controlled to cause each of the various rollers (e.g. application roller 152 and peel roller 190) to be correctly oriented with respect to a direction of travel for the various tasks required by media loader 124. Each of the required roller directional orientations can be determined for each required task by various methods including trial and error methods. These directional orientations can be further tailored in accordance with media changes, such as but not limited to, the size and caliper of the media. Controller 135 can be programmed with data and drive instructions for first drive 170 and second drive 172 to align one or more rollers of media loader 124 with a desired orientation. Drive instructions can be further varied in accordance with environmental changes (e.g. temperature and humidity) and other factors such as wear of various motion components (e.g. guides and guide bearings).

Various embodiments of the invention have been described in terms of manufacturing color filters for various displays. In some example embodiments of the invention, the displays can be LCD displays. In other example embodiments of the inventions, the displays can be organic light-emitting diode (OLED) displays. OLED displays can include different configurations. For example, in a fashion similar to LCD display, different color features can be formed into a color filter used in conjunction with a white OLED source. Alternatively, different color illumination sources in the display can be formed with different OLED materials in various embodiments of the invention. In these embodiments, the OLED based illumination sources themselves control the emission of colored light without necessarily requiring a passive color filter. OLED materials can be transferred to suitable media. OLED materials can be transferred to a receiver element with laser-induced thermal transfer techniques.

While the invention has been described using as examples applications in display and electronic device fabrication, the methods described herein are directly applicable to other applications including those used in biomedical imaging for lab-on-a-chip (LOC) fabrication. The invention can have application to other technologies, such as medical, printing and electronic fabrication technologies, or any other technology which uses webs.

As will be apparent to those skilled in the art in light of the foregoing disclosure, many alterations and modifications are possible in the practice of this invention without departing from the spirit or scope thereof.

PARTS LIST

10 substrate
12 donor element
14 lasers
16 laser beams
102 apparatus
103 support
110 substrate
112 donor element
113 media roll
114 donor element
115 media roll
116 donor element
117 media roll
120 media supply
122 media feed system
124 media apply/peel system (media loader)
126 disposal system
130 imaging system
135 controller
136 imaging head
137 image data
140 frame
141 pivot
142 picking mechanism
143 picking roll
144 suction features
145 edge portion
146 feed gantry
147 suction features
149 cutter
150 carriage
152 application roller
153 rotation axis
154 suction features
156 actuators
160 wrinkles
162 entrapped wrinkles
170 first drive
172 second drive
173 spaces
174 guides
174A first guide
174B second guide
175A timing belt
175B timing belt
176A guide bearing
176B guide bearing
178 flexures
179A guide coupling
179B guide coupling
180A home sensor
180B home sensor
182A away sensor
182B away sensor
185 imaging support
187 bridge support
188 stands
189A suction features
189B suction features
190 peel roller
190A rotation axis
191 take-up roller
191A rotation axis
193 peel roller coupling
194 take-up roller coupling
197 take-up roller position-axis actuator
198 take-up roller rotational axis actuator
199 peel roller position-axis actuator
200 suction features
210 edge portion
212 non-imaged region
214 imaged region
215 portion
300 step
310 step
320 step
330 step
340 step
350 step
360 step
370 step
380 step
400 radius
402 path

404 media load position
406 path
408 path
408A away direction
408B home direction
410 non-uniform stress distribution
412 uniform stress distribution
414 media removal position
415 rotation axis
417 media application position
418 arrow
420 first end
422 second end
424 surface
450A common axis
450B common axis
$\Delta_A$ displacement
$\Delta_B$ displacement
$\Delta_C$ displacement
$\alpha$ angle
$\beta$ angle
$\gamma$ angle
$\delta$ angle
$\eta$ angle
$\theta$ angle

What is claimed is:

1. A method for conveying media, comprising:

providing a rotatable roller comprising a first end and a second end and a surface adapted to wrap a portion of the media thereon;

providing a carriage operable for conveying the roller along a path, providing a plurality of drives operable for moving the roller, wherein the plurality of drives includes a first drive and a second drive;

differentially operating the first drive and the second drive to reorient the roller with respect to a direction along the path; and conveying the portion of the media while conveying the reoriented roller.

2. A method according to claim 1, comprising operating the first drive and the second drive to move the carriage along the path.

3. A method according to claim 1, comprising rotating the reoriented roller about its axis of rotation while conveying the media.

4. A method according to claim 1, comprising rotating the reoriented roller about its axis of rotation to wrap the portion of the media onto the surface, wherein the portion of the media is sized to wrap over the surface of the reoriented roller without overlapping itself.

5. A method according to claim 1, comprising non-differentially operating the first drive and the second drive to convey the reoriented roller along a portion of the path.

6. A method according to claim 1, wherein reorienting the roller with respect to the direction along the path aligns the roller to roll along a direction that is substantially parallel to the direction along the path.

7. A method according to claim 2, comprising non-differentially operating the first drive and the second drive to move the carriage along a portion of the path.

8. A method according to claim 2, comprising differentially operating the first drive and the second drive to reorient the carriage with respect to the direction along the path.

9. A method according to claim 8, comprising non-differentially operating the first drive and the second drive to move the reoriented carriage along a portion of the path.

10. A method according to claim 2, wherein the carriage comprises a first guided end and a second guided end, and the method further comprises differentially operating the first drive and the second drive to displace the second guided end relative to the first guided end along a direction that is parallel to the direction along the path.

11. A method according to claim 10, comprising moving the first guided end and the relatively displaced second guided end in tandem along the path.

12. A method according to claim 1, wherein the media is assembled on a media roll, and the method comprises differentially operating the first drive and the second drive to align the roller to the media roll, and transferring the portion of the media between the media roll and the aligned roller.

13. A method according to claim 12, comprising differentially operating the first drive and the second drive to reduce an in-plane misalignment existing between the roller and the media roll.

14. A method according to claim 12, comprising differentially operating the first drive and the second drive to increase uniformity of the tension created across the width of the portion of the media as the portion of the media is transferred between the media roll and the aligned roller.

15. A method according to claim 12, wherein the axis of rotation of the roller and the axis of rotation of the media roll are both intersected by a common axis, and the method comprises differentially operating the first drive and the second drive to increase the degree of perpendicularity between the common axis and each of the axis of rotation of the aligned roller and the axis of rotation of the media roll.

16. A method according to claim 12, comprising separating the portion of the media from the media assembled on the media roll.

17. A method according to claim 1, wherein reorienting the roller with respect to the direction along the path comprises differentially operating the first drive and the second drive to orient the roller with a first orientation with respect to the direction along the path at a first position along the path and differentially operating the first drive and the second drive to orient the roller with a second orientation with respect to the direction along the path at a second position along the path, wherein the second orientation is different than the first orientation.

18. A method according to claim 17, comprising wrapping the portion of the media on the surface of the roller when the roller is oriented with the first orientation and transferring the wrapped portion of the media to a substrate when the roller is oriented with the second orientation.

19. A method according to claim 18, comprising non-differentially operating the first drive and the second drive to transfer the wrapped portion of the media to the substrate.

20. A method according to claim 18, wherein transferring the wrapped portion of the media to the substrate comprises rolling the roller relative to the substrate when the roller is oriented with the second orientation.

21. A method according to claim 1, comprising removing the portion of the media from a substrate by rolling the reoriented roller relative to the substrate.

22. A method according to claim 1, comprising non-differentially operating the first drive and the second drive to remove the portion of the media from a substrate.

23. A method according to claim 1, comprising imaging the portion of the media in an imaging process.

24. A method according to claim 23, wherein the imaging process includes a laser-induced thermal transfer process.

25. A method according to claim 1, wherein the media is a donor element and the method comprises transferring donor material from the donor element to a substrate.

26. A method according to claim 1, wherein reorienting the roller with respect to the direction along the path comprises differentially operating the first drive and the second drive to displace the second end relative to the first end along a direction that is parallel to the direction along the path.

27. Apparatus for conveying media, comprising:

a support;

a rotatable roller comprising a first end and a second end and a surface adapted to wrap a portion of the media thereon;

a carriage moveably mounted on the support and operable for conveying the roller along a path, a plurality of drives operable for moving the roller, wherein the plurality of drives includes a first drive and a second drive; and a controller programmed for differentially operating the first drive and the second drive to reorient the roller with respect to a direction along the path and for operating the carriage to convey the reoriented roller while conveying the portion of the media.

28. Apparatus according to claim 27, wherein the roller is one of: an application roller, a peel roller and a take-up roller.

29. Apparatus according to claim 27, wherein the plurality of drives are operable for moving the carriage along the path and the controller is programmed for operating the first drive and the second drive to move the carriage along the path.

30. Apparatus according to claim 27, wherein the controller is programmed for differentially operating the first drive and the second drive while moving the carriage along a first portion of the path and non-differentially operating the first drive and the second drive while moving the carriage along a second portion of the path.

31. Apparatus according to claim 29, wherein the controller is programmed for differentially operating the first drive and the second drive to move the carriage along a first portion of the path and non-differentially operating the first drive and the second drive to move the carriage along a second portion of the path.

32. Apparatus according to claim 29, wherein the carriage includes a first guide bearing and a second guide bearing and the controller is programmed for differentially operating the first drive and the second drive to displace the second guide bearing relative to the first guide bearing along a direction that is parallel to the direction along the path.

33. Apparatus according to claim 32, comprising a flexure operable for allowing the carriage to pivot about one of the first guide bearing and the second guide bearing.

34. Apparatus according to claim 27, wherein the controller is programmed for differentially operating the first drive and the second drive to displace the second end relative to the first end along a direction that is parallel to the direction along the path.

35. A method for imaging media, comprising:

providing a carriage operable for conveying a roller along a path;

mounting media on the roller;

conveying the mounted media to an imaging system positioned along the path;

reorienting the roller with respect to a direction along the path;

transferring the mounted media from the reoriented roller to a surface, wherein the transferring comprises establishing relative movement between the carriage and the surface; and imaging the transferred media.

36. A method according to claim 35, comprising providing a plurality of drives operable for moving the roller, and differentially operating the plurality of drives to reorient the roller with respect to the direction along the path.

37. A method according to claim 36, comprising non-differentially operating the plurality of drives while transferring the mounted media from the reoriented roller to the surface.

38. A method according to claim 36, comprising operating the plurality of drives to move the carriage along the path.

39. A method according to claim 36, comprising operating the plurality of drives to move the carriage while transferring the mounted media from the reoriented roller to the surface.

40. A method according to claim 35, comprising transferring the mounted media from the reoriented roller to the surface by rolling the reoriented roller over the surface.

41. A method according to claim 35, wherein the roller is an application roller.

42. A method according to claim 35, wherein the carriage is operable for conveying a contact roller along the path, and the method comprises:

changing an orientation of the contact roller with respect to the direction along the path;

contacting the imaged media with the reoriented contact roller; and removing the imaged media from the surface.

43. A method according to claim 42, comprising providing a plurality of drives operable for moving the contact roller, and differentially operating the plurality of drives to reorient the contact roller with respect to the direction along the path.

44. A method according to claim 43, comprising non-differentially operating the plurality of drives while removing the imaged media from the surface.

45. A method according to claim 43, comprising operating the plurality of drives to move the carriage while removing the imaged media from the surface.

46. A method according to claim 43, comprising removing the imaged media from the surface by rolling the reoriented contact roller over the media.

47. A method according to claim 46, comprising providing a take-up roller operable for winding up the imaged media while removing the imaged media from the surface.

48. A method according to claim 35, comprising imaging the transferred media with a thermal transfer process.

49. A method according to claim 42, wherein the contact roller is a peel roller.

* * * * *